US009699630B2

(12) United States Patent
Rhim

(10) Patent No.: US 9,699,630 B2
(45) Date of Patent: Jul. 4, 2017

(54) SYSTEM, TERMINAL, AND METHOD FOR OPERATING A COMMUNICATION SERVICE FUNCTION

(71) Applicant: Samsung Electronics Co., Ltd., Gyeonggi-do (KR)

(72) Inventor: Eunhee Rhim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/856,777

(22) Filed: Apr. 4, 2013

(65) Prior Publication Data

US 2013/0267208 A1    Oct. 10, 2013

(30) Foreign Application Priority Data

Apr. 4, 2012  (KR) ........................ 10-2012-0035012

(51) Int. Cl.
*H04M 3/24*  (2006.01)
*H04W 4/16*  (2009.01)

(52) U.S. Cl.
CPC ..................................... *H04W 4/16* (2013.01)

(58) Field of Classification Search
USPC ...... 455/412.1–415, 459–460, 466, 566, 567
See application file for complete search history.

(56) References Cited

U.S. PATENT DOCUMENTS

| | | | | |
|---|---|---|---|---|
| 6,795,541 | B2 * | 9/2004 | Oren ................. | H04M 3/42382 370/352 |
| 2002/0118807 | A1 * | 8/2002 | Pedersen ........... | H04M 3/42382 379/142.01 |
| 2003/0188010 | A1 * | 10/2003 | Raza ................... | H04L 12/5875 709/238 |
| 2005/0123118 | A1 | 6/2005 | Terry et al. | |
| 2006/0040694 | A1 * | 2/2006 | Yoon ....................... | H04M 3/46 455/519 |
| 2007/0047523 | A1 | 3/2007 | Jiang | |
| 2007/0165610 | A1 * | 7/2007 | Tseng ................ | H04L 29/06027 370/356 |
| 2009/0022285 | A1 * | 1/2009 | Swanburg ......... | H04L 29/12047 379/88.11 |
| 2009/0207995 | A1 * | 8/2009 | Wasmund ........... | H04M 3/2281 379/242 |
| 2009/0290574 | A1 * | 11/2009 | Bottiero .............. | H04M 7/0045 370/352 |
| 2010/0029251 | A1 * | 2/2010 | McConnell ............. | H04L 29/06 455/413 |
| 2010/0130159 | A1 | 5/2010 | Wu et al. | |
| 2010/0216431 | A1 * | 8/2010 | Zhang .................. | H04L 63/101 455/411 |
| 2010/0296643 | A1 | 11/2010 | Athias | |

(Continued)

*Primary Examiner* — Dai A Phuong

(74) *Attorney, Agent, or Firm* — The Farrell Law Firm, P.C.

(57) ABSTRACT

A method, system, and terminal for providing a communication service function are provided herein. A system for supporting a communication service, includes: a receiver side terminal that provides a communication service list including communication service items, in response to a call connection request message; and a transmitter side terminal that transmits the call connection request message to the receiver side terminal, receives the communication service list provided from the receiver side terminal, and displays the received communication service list.

18 Claims, 14 Drawing Sheets

(56) References Cited

U.S. PATENT DOCUMENTS

| | | |
|---|---|---|
| 2011/0009096 A1 | 1/2011 | Rotsztein et al. |
| 2012/0034907 A1 | 2/2012 | Lee et al. |
| 2012/0058748 A1* | 3/2012 | Jeung .................... H04W 88/06 455/414.1 |
| 2013/0094642 A1* | 4/2013 | Sverdlov ............... H04M 3/565 379/201.03 |
| 2013/0225134 A1* | 8/2013 | Earnshaw ............. H04M 3/436 455/413 |
| 2013/0225244 A1* | 8/2013 | Khosravi .......... H04M 1/72522 455/566 |
| 2015/0105112 A1* | 4/2015 | Gilson ................... H04W 4/12 455/466 |

\* cited by examiner

FIG. 14
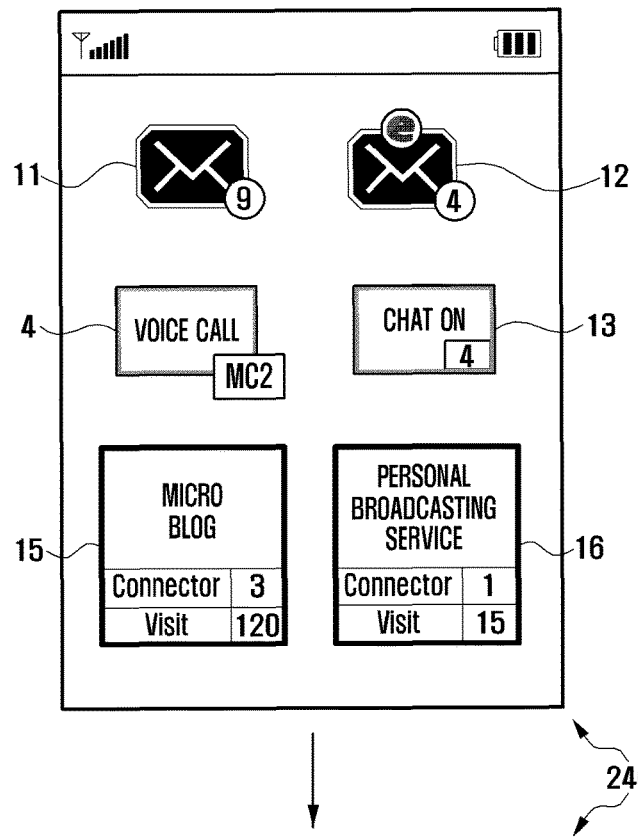
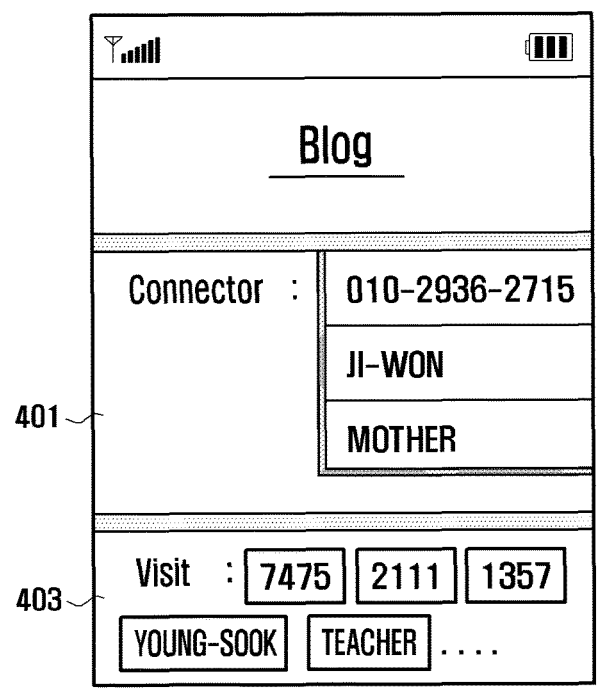

SYSTEM, TERMINAL, AND METHOD FOR OPERATING A COMMUNICATION SERVICE FUNCTION

PRIORITY

This application claims priority under 35 U.S.C. §119(a) to Korean Patent Application Serial No. 10-2012-0035012, which was filed in the Korean Intellectual Property Office on Apr. 4, 2012, the entire disclosure of which is hereby incorporated by reference.

BACKGROUND OF THE INVENTION

1. Field of the Invention

The present invention relates generally to a communication based service function of a terminal, and more particularly, to a system, apparatus, and method for selecting a communication based service function suited to a taste of a transmitter side terminal user.

2. Description of the Related Art

A communication function is generally used in a portable terminal and other terminals. To use the communication function, a user purchased a call terminal and used an instant and convenient call connection service with other users.

Specifically, after a transmission side user requests call connection to a reception side user, the transmission side user waits until the reception side user accepts the call connection request. If the reception side user accepts the call connection request, a communication channel is established between the transmission side user and the reception side user, so that the two parties can talk.

However, in the above-described procedure, when the reception side user does not accept the call connection request, the transmission side user must wait in a call idle state for a long time. That is, because the transmission side user continuously maintains an idle state until a call is connected, when the reception side user does not accept the call connection request, the transmission side user often gets tired of waiting and is discomforted. Because conventional terminals perform a communication based service in a designated scheme, for example, a determined scheme such as a voice call connection scheme, transceiving terminals cannot use other communication based services.

SUMMARY OF THE INVENTION

Accordingly, the present invention is designed to address at least the problems and/or disadvantages described above and to provide at least the advantages described below.

An aspect of the present invention is to provide a communication based service method for selecting and using at least one of various communication functions, which a receiver side terminal can support, when a transmitter side terminal and the receiver side terminal communicate, and a system and a terminal supporting the same.

In accordance with an aspect of the present invention, a system for supporting a communication based service is provided. The system includes a receiver side terminal that provides a communication service list including communication service items, in response to a call connection request message; and a transmitter side terminal that transmits the call connection request message to the receiver side terminal, receives the communication service list provided from the receiver side terminal, and displays the received communication service list.

In accordance with another aspect of the present invention, a method for supporting a communication service is provided for a system including a transmitter side terminal and a receiver side terminal. The method includes providing, by the transmitter side terminal, a call connection request message to the receiver side terminal by; providing, by the receiver side terminal, a communication service list to the transmitter side terminal; and outputting, by the transmitter side terminal, the communication service list.

In accordance with another aspect of the present invention, a method of a transmitter side terminal for performing a communication based service. The method includes transmitting a call connection request message to another terminal; receiving a communication service list including communication services supported by the another terminal, in response to the call connection request message; and outputting the received communication service list.

In accordance with another aspect of the present invention, a transmitter side terminal that supports a communication based service is provided. The terminal includes a communication unit that transmits a call connection request message to another terminal, and receives a communication service list including communication services supported by the another device, in response to the call connection request message; a display that outputs the received communication service list; an input that generates an input signal for transmitting the call connection request message to the another terminal; and a controller that controls the transmission of the call connection request message, and the reception and output of the communication service list.

In accordance with another aspect of the present invention, a method of a receiver side terminal for performing a communication based service is provided. The method includes receiving a call connection request message from another terminal; and transmitting a communication service list including communication services provided from the received side terminal, before accepting the call connection request message.

In accordance with another aspect of the present invention, a receiver side terminal that supports a communication based service is provided. The receiver side terminal includes a communication unit that receives a call connection request message from another terminal; and a controller that controls that the communication unit to transmit a communication service list including communication services supported by the received side terminal, before call connection.

BRIEF DESCRIPTION OF THE DRAWINGS

The above and other aspects, features, and advantages of certain embodiments of the present invention will be more apparent from the following detailed description in conjunction with the accompanying drawings, in which:

FIG. 14 illustrates an example of a screen for confirming a communication based service usage state that is output from a receiver side terminal according to an embodiment of the present invention.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

In accordance with an embodiment of the present invention, a communication based service includes at least one of a voice call service, a video call service, a message service, an e-mail service, a micro blog service, a personal broadcasting service, and a chatting service supported from a receiver side terminal. Accordingly, a communication based service list as used herein allows a user to confirm and select at least one from the above-described communication based services.

Figure 1:
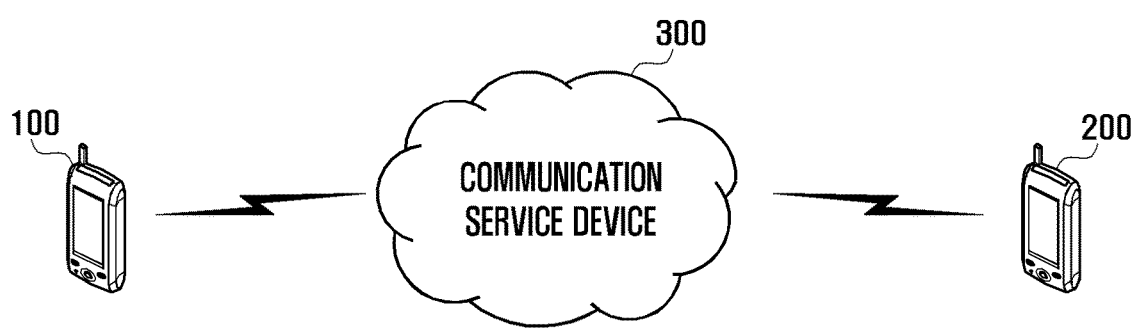
FIG. 1 illustrates a communication system according to an embodiment of the present invention.

FIG. 1 illustrates a communication system according to an embodiment of the present invention.

Referring to FIG. 1, the communication system includes a transmitter side terminal 100, a receiver side terminal 200, and a communication service device 300.

In FIG. 1, the communication system provides a communication service list and a communication service provided from one of the receiver side terminal 200 and the communication service device 300, when the transmitter side terminal 100 requests a call to the receiver side terminal 200 through the communication service device 300.

More specifically, when the transmitter side terminal 100 requests a call connection with the receiver side terminal 200, the transmitter side terminal 100 is provided with a communication service list that includes different communication services that are supportable by the receiver side terminal 200. The communication service list may be provided from the receiver side terminal 200, in response to the call connection request, or from the communication service device 300, when the receiver side terminal 200 has previously registered its communication service list in the communication service device 300.

Accordingly, the transmitter side terminal 100 may selectively use one of communication services supported by the receiver side terminal 200 or use one of communication services that the receiver side terminal 200 requests as default.

The communication service device 300 forms a communication channel between the transmitter side terminal 100 and the receiver side terminal 200. Particularly, the communication service device 300 may support various data transfer and processing for communication based service support of the present invention between the transmitter side terminal 100 and the receiver side terminal 200. The communication service device 300 may include various communication devices capable of supporting a communication scheme according to terminal characteristics of the transmitter side terminal 100 and the receiver side terminal 200. For example, when the transmitter side terminal 100 and the receiver side terminal 200 are mobile communication terminals, the communication service device 300 includes a base station for supporting the mobile communication terminals, a bases station controller, and a mobile switching center. When at least one of the transmitter side terminal 100 and the receiver side terminal 200 supports a wired communication scheme, the communication service device 300 includes a network device for supporting a corresponding communication scheme.

When receiving a call connection request with the receiver side terminal 200 from the transmitter side terminal 100, the communication service device 300 transmits a call connection request message to the receiver side terminal 200. The communication service device 300 receives, from the receiver side terminal 200, a communication service list to be provided to the transmitter side terminal 100, or receives communication service information from the receiver side terminal 200, and then may generate and provide the communication service list to the transmitter side terminal 100, or may merely pass the communication service information to the transmitter side terminal 100.

When receiving a signal for selecting a communication service from the transmitter side terminal 100, the communication service device 300 transmits information corresponding to the selected communication service to the transmitter side terminal 100.

Alternatively, the receiver side terminal 200 may previously provide the communication service device 300 a default communication service for a call connection request from a specific transmitter side terminal 100.

The communication service device 300 may process the communication service information or the communication service list to form that can be received by the transmitter side terminal 100. That is, the communication service device 300 may rearrange the communication service information from the receiver side terminal 200, adjust the communication service information to a predetermine size, write additional information, or remove schedule information, and provide the processed information to the transmitter side terminal 100.

As indicated above, the communication service device 300 also supports the registering of the communication service information or the communication service list from the receiver side terminal 200. For example, when receiving the communication service information from the receiver side terminal 200, the communication service device 300 registers and manages corresponding information as a phone number associated with the receiver side terminal 200. During the procedure, as described above, the communication service device 300 may process, store, and manage received communication service information according to a previously defined scheme.

Additionally, a user of the receiver side terminal 200 may confirm a communication service list and a service screen during the processing procedure. The communication service device 300 forms a data communication channel with the receiver side terminal 200, and performs a procedure for harmonizing communication service information to be provided to the specific transmitter side terminal 100. For example, the communication service device 300 provides a screen for selecting at least one communication service to provide a communication service information adjustment function, and provide a configuration function for configuring a communication service list for selecting a user of the receiver side terminal 200. If the receiver side terminal 200 selects at least one of the communication services, the communication service device 300 provide a communication service list and a screen for configuring a communication based service. If the corresponding list and the configuration of the service are terminated, the communication service device 300 stores and manages the corresponding list and the configuration of the service using a phone number of the receiver side terminal 200.

When a communication service is supported, the communication service device 300 may transfer the communication service list and the communication service screen from the receiver side terminal 200 to the transmitter side 100 as it is, without first processing the information. That is, the communication service device 300 may relay communication service information provided from the receiver side terminal 200 to the transmitter side terminal 100. In this case, the transmitter side terminal 100 and the receiver side terminal 200 may perform signal transceiving according to a Point-to-Point (P2P) communication scheme.

The communication service device 300 may receive a communication service list with respect to a plurality of transmitter side terminals 100 to be provided by schedule groups or designated phone numbers and limited information with respect to a type of a communication based service when receiving communication based service related information from the receiver side terminal 200. Thereafter, when one of the specific transmitter side terminals 100 requests call connection to the receiver side terminal 200, the communication service device 300 may selectively provide a communication service list and a communication service corresponding the transmitter side terminal 100, based on a phone number of a transmitter side terminal 100 previously defined in the limited information and a group in which the transmitter side terminal 100 is included. That is, the communication service device 300 allows the receiver side terminal 200 to separately transfer a communication service list previously registered by previously registered transmitter side terminals 100 and communication service information. Accordingly, the transmitter side terminals 100 may be limited such that the receiver side terminal 200 uses different communication service lists and communication service information by designated settings.

The transmitter side terminal 100 performs a call connection request to the receiver side terminal 200 through the communication service device 300. For example, the transmitter side terminal 100 may transfer a call connection request message to the communication service device 300, based on a phone number input by the user. In this case, the transmitter side terminal 100 may receive a previously registered communication service list and a communication service provided from the communication service device 300 according to a request of the receiver side terminal 200 or a communication service list screen and a communication service screen directly provided from the receiver side terminal 200. The transmitter side terminal 100 transfers a signal for selecting a communication service list to at least one of the communication service device 300 and the receiver side terminal 200 according to designation of the user, so that the at least one of the communication service device 300 and the receiver side terminal 200 may receive information corresponding to the selected communication based service to use a corresponding service. In the transmitter side terminal 100, a type of an available communication based service may be changed according to a designation of the receiver side terminal 200.

The receiver side terminal 200 generates a communication service list and communication service information to be directly provided to the transmitter side terminal 100 or to the communication service device 300 through the transmitter side terminal 100. The receiver side terminal 200 may provide the generated communication service information or the communication service list to the communication service device 300 or to the transmitter side terminal 100.

Specifically, when receiving a call connection request from the transmitter side terminal 100, the receiver side terminal 200 may provide communication service information or a communication service list. In this case, the receiver side terminal 200 may differently set communication service information to be provided according to unique information, for example, a phone number of the transmitter side terminal 100, and may not support a separate communication service, with respect to a specific transmitter side terminal 100. The receiver side terminal 200 may register communication service information or limited information for each transmitter side terminal 100.

As described above, a receiver side terminal 200 provides communication service information to the transmitter side terminal 100. The transmitter side terminal 100 then selectively uses communication services for each receiver side terminal 200, instead of using uniform information provided from the communication service device 300. The receiver side terminal 200 may acquire specific information to be provided, a time space capable of providing information, and limits use approach of use for each transmitter side terminal so that information use value may be increased.

Figure 2:
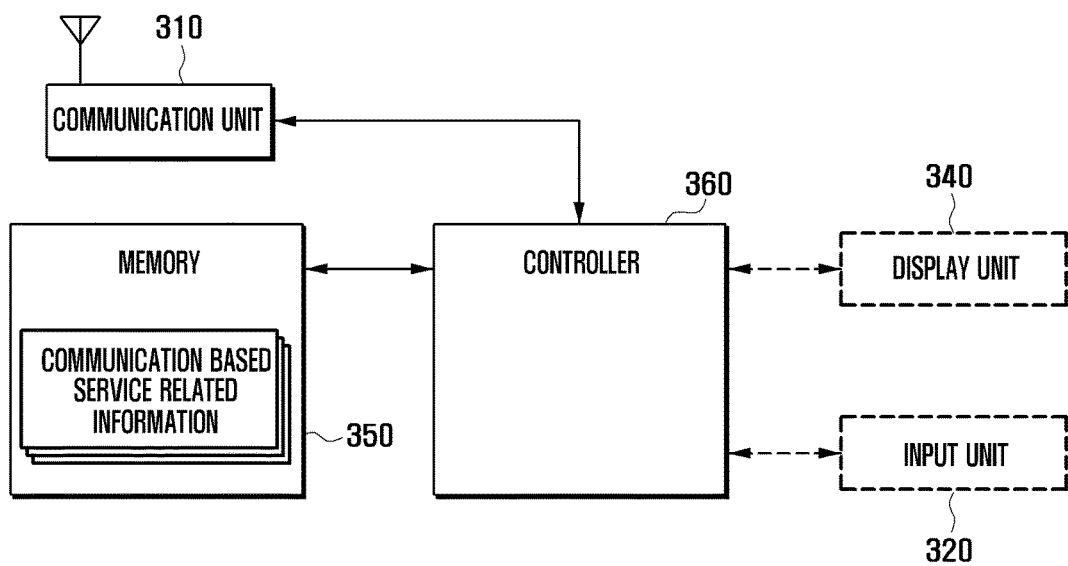
FIG. 2 illustrates a communication service device according to an embodiment of the present invention.

FIG. 2 illustrates a communication service device according to an embodiment of the present invention.

Referring to FIG. 2, the communication service device includes a communication unit 310, a memory 350, and a controller 360. To manage the communication service device 300, the communication service device 300 may selectively include an input 320, such as a keypad, and a display 340, such as a Liquid Crystal Display (LCD).

The communication unit 310, e.g., a Radio Frequency (RF) communication, Bluetooth communicator, etc., forms a communication channel with the transmitter side terminal 100 and the receiver side terminal 200. The communication unit 310 receives a call connection request message for the receiver side terminal 200, from the transmitter side terminal 100, and transfers a call connection request message to the receiver side terminal 200. The communication unit 310 also receives communication service information from the receiver side terminal 200. The communication service information may be received before or after the transmitter side terminal 100 transmits a call connection request image. The communication unit 310 provides the communication service information received from the receiver side terminal 200 to the transmitter side terminal 100.

The communication unit 310 may receive, from the transmitter side terminal 100, a selection signal that selects a communication service, receive selected communication service information from the receiver side terminal 200, and transfer the selected communication service information to the transmitter side terminal 100.

The communication service information may be provided according to a design scheme of a system. Further, the communication unit 310 may receive limited information that limits the communication services provided from the receiver side terminal 200. For example, the limited information may include preset information, such that the receiver side terminal 200 can differently provide communication based services for each transmitter side terminal.

The memory 350 stores communication service information to support the communication based service of the present invention. For example, the memory 350 stores and manages the communication service information using unique information, e.g., a phone number associated with the receiver side terminal 200 as an index so that the communication based service related information 351 is stored and managed for each receiver side terminal 200. In addition, the memory 350 may store limited information for each transmitter side terminal 100, as set by the receiver side terminal 200.

When the communication service device 300 merely relays the communication service information between the transmitter side terminal 100 and the receiver side terminal 200, the communication service information does not have to be stored.

Further, the memory 350 stores and manages information for a call connection with the receiver side terminal 200 and the transmitter side terminal 100, for example, location information of the terminals.

The controller 360 controls the overall operation of the communication service device. Specifically, the controller 360 processes and transfers various information to support a communication service as described herein.

When receiving the communication service information from the receiver side terminal 200, the controller 360 may transfer corresponding information to the transmitter side terminal 100, which has requested a call connection to the receiver side terminal 200. The controller 360 may rearrange or process the communication service information in a previously defined scheme, according to a policy of the communication service device, and may transfer the rearranged or processed information to the transmitter side terminal 100.

The controller 360 may transmit communication service information including specific reporting information to the transmitter side terminal 100 according to policy. For example, the reporting information includes a call accept reporting message of the receiver side terminal 200, and advertisement information generated from the communication service device.

Additionally, the controller 360 may directly transfer communication service information provided from the receiver side terminal 200 to the transmitter side terminal 100, without separately processing, rearranging or adding reporting information according to service policy.

When the communication service information is provided, the controller 360 determines whether there is previously registered limited information of the receiver side terminal 200. When there is the previously registered limited information of the receiver side terminal 200, the controller 360 determines which classification the transmitter side terminal 100 receiving the communication service information belongs to. The controller 360 then provides communication service information suited to the transmitter side terminal 100 having currently requested call connection. Accordingly, the controller 360 may previously generate, store, and manage respective communication service information according to the limited information.

The controller 360 controls generation and transferring of communication service information suited to a corresponding transmitter side terminal 100, based on communication service information received from the receiver side terminal 200, when the receiver side terminal 200 is previously registered or accepts the call connection.

The controller 360 may transfer a communication service list to the transmitter side terminal 100, and then provide the transmitter side terminal 100 with information corresponding to a communication service selected by the transmitter side terminal 100 from the communication service list.

Figure 3:
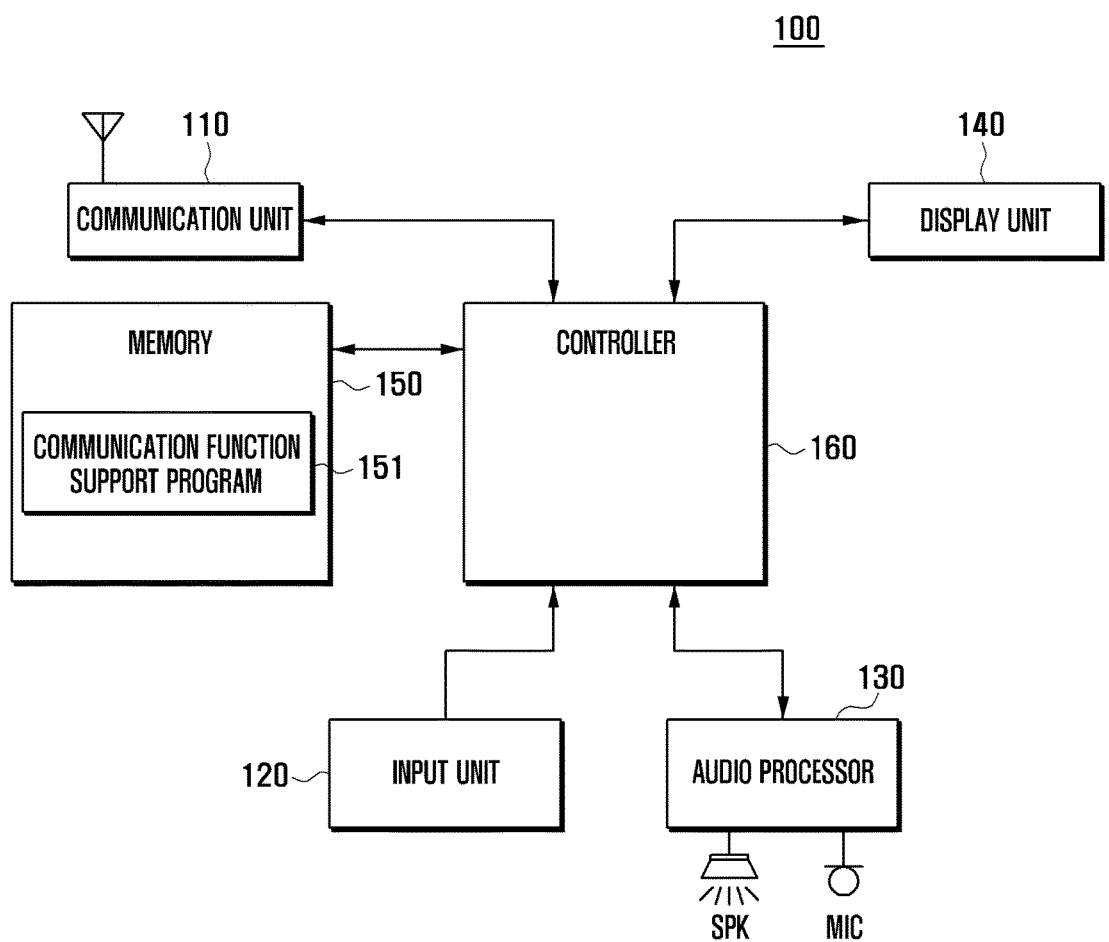
FIG. 3 illustrates a transmitter side terminal according to an embodiment of the present invention.

FIG. 3 illustrates a transmitter side terminal according to an embodiment of the present invention.

Referring to FIG. 3, the transmitter side terminal includes a communication unit 110, an input 120, an audio processor 130, and a display 140, such as an LCD, a memory 150, and a controller 160.

The communication unit 110 forms a communication channel with the communication service device 300, or forms a communication channel with the receiver side terminal 200 through the communication service device 300. The communication unit 110 includes a communication device for communicating with a specific communication technology or scheme, such as Second Generation (2G), Third Generation (3G), Fourth Generation (4G), Fifth Generation (5G), Time Division Multiple Access (TDMA), Code Division Multiple Access (CDMA), Wideband-CDMA (WCDMA), Frequency Division Multiple Access (FDMA), Orthogonal-FDMA (OFDMA), or a wired/wireless network based communication.

The communication unit 110 forms at least one of a voice channel, a message channel, and a data channel with the communication service device 300 in real time, periodically, or fixedly according to a type of communication service information. The communication unit 110 may receive communication service information from the communication service device 300 based on the communication channel, transfers a communication service selection signal to the communication service device 300, and then receives communication service information corresponding to the selection signal.

The input 120 generates input signals for operating the transmitter side terminal. For example, the input 120 includes a specific key such as a button, a side key, a home key, or a touch map for supporting a full touch screen. The touch map is displayed on the display 140 and generates an input signal according to user touch.

The input 120 generates an input signal for requesting a call connection with the receiver side terminal 200, an input signal for selecting a communication service, upon receipt of a communication service list, and an input signal for controlling a communication service screen. The input 120 generates an input signal for reserving a communication service according to a call connection or for terminating a communication service list screen, according to a user request, and an input signal for terminating a communication service. The generated input signals are transferred to the controller 160 and may be used as a command for supporting a function corresponding to the input signal.

The audio processor 130 processes and collects audio signals associated with the transmitter side terminal. The audio processor 130 includes a speaker (SPK) for outputting an audio signal and a microphone (MIC) for collecting an audio signal. When the communication unit 110 forms a communication channel with the receiver side terminal 200, the audio processor 130 outputs a transceived audio signal and collects a user voice. Particularly, the audio processor 130 outputs an audio signal included in the communication service information. For example, the audio processor 130 may output a communication service list as an audio signal. When the communication service supports an audio signal output function, the audio processor 130 may output a corresponding audio signal. The audio processor 130 may output a guide sound or an effect sound corresponding to a call connection acceptance, or a guide sound guiding termination or pausing of the communication service according to the call connection acceptance. The output of the guide sound or the effect sound may be omitted according to a user setting.

The display 140 provides various screen interfaces for operating the transmitter side terminal. The display 140 may include a touch panel and a display panel to support a touch function. The display 140 may output a screen for inputting a phone number for call connection with the receiver side terminal 200 or selecting phone book information, a screen requesting a call connection to the receiver side terminal 200, a communication service list output screen, or selected or designated communication service support screen.

The display 140 may output a communication service termination or pause screen according to the situation. Although a call connection is accepted for a specific service screen, for example, an image display screen from the communication service screens, a corresponding service screen output may remain.

When an input signal for terminating the communication service is generated, the display 140 may output a call idle screen supported from the transmitter side terminal 100 or provided from the communication service device 300.

The memory 150 stores various application programs for operating the transmitter side terminal or for supporting a specific terminal function. For example, the memory 150 supports an operating system for operating the transmitter side terminal, a call function support program for call connection, a video call function support program for supporting a video call, and a server connection support program for connecting to an external server. Particularly, the memory 150 stores a communication function support program 151 to support a communication based service.

The communication function support program 151 includes routines supporting output and operation of corresponding communication service information, when receiving communication service information from the communication service device 300 or the receiver side terminal 200. For example, when the communication service information includes a communication service list, the communication function support program 151 includes a screen interface support routine that allows a user to select at least one service from a corresponding service list.

When link information for connecting to a specific blog, website, or specific server address is included in the communication service information, the communication function support program 151 includes routines that allow a user to connect with a corresponding server, based on corresponding link information and outputs a screen according to the connection on the display 140.

When the communication service information includes various image and audio files, the communication function support program 151 includes routines for outputting corresponding image and audio files. If micro blog service information or personal broadcasting service information provided from the receiver side terminal 200 is included in the communication service information, the communication function support program 151 includes a routine for outputting a corresponding micro blog service screen or personal broadcasting service screen on the display 140.

A micro blog differs from a traditional blog in that its content is typically smaller in both actual and aggregate file size, i.e., more suitable for mobile terminals. For example, the micro blog is a blog which a user of the receiver side terminal 200 operates based on a corresponding terminal, which may be a blog operated based on images, audio files, text files, various tag information, and link information stored in the receiver side terminal 200 or stored in a specific external server designated by the receiver side terminal 200. The external server may be the communication service device 300 described above.

The controller 160 controls the overall processing for operating the transmitter side terminal. Specifically, the controller 160 control signals for using a communication service according to an embodiment of the present invention.

More specifically, if a phone number of the receiver side terminal 200 or phone book information corresponding thereto is selected, the controller 160 controls message transmission that requests a call connection with the receiver side terminal 200 to the communication service device 300. When receiving a communication service list from the communication service device 300 or the receiver side terminal 200, the controller 160 outputs a communication service list. If a communication service item is selected from the list, the controller 160 controls a message including a selection signal to be transmitted to the communication service device 300 or the receiver side terminal 200.

The controller 160 supports signal processing for supporting a communication based specific service according to a selection signal, for example, a chatting service, a video call service, a micro blog service, or a personal broadcasting service.

The controller 160 controls that a corresponding service is performed during a call waiting time. That is, the transmitter side terminal supports specific communication services, for example, a micro blog service, a personal broadcasting service, and a message service, before a call connection acceptance of a corresponding service by the receiver side terminal 200. If the call connection acceptance is achieved, the controller 160 then terminates, pauses, or background-processes the executed communication based service, while the call is conducted.

When the user generates an input signal for rejecting the communication based service, the controller 160 may transmit a message including a corresponding input signal to the communication service device 300 or the receiver side terminal 200, and output a preset call connection request screen on the display 140.

Figure 4:
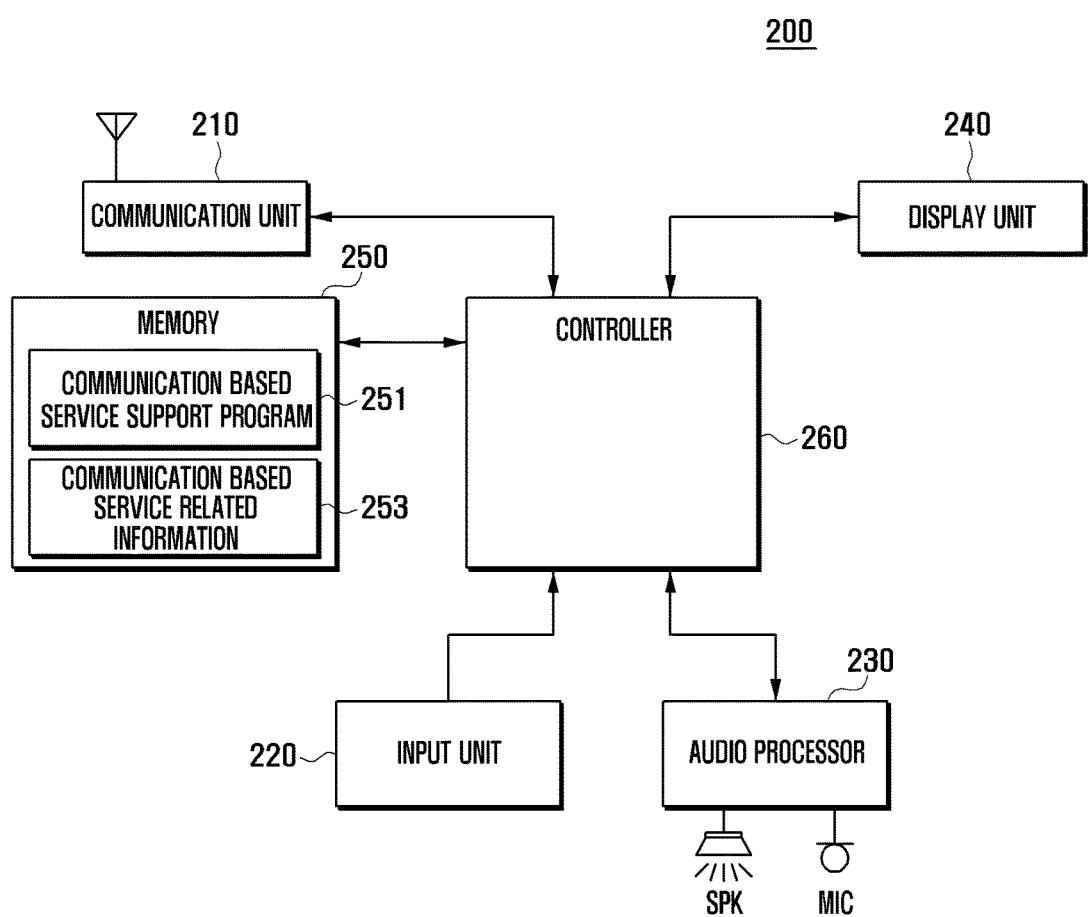
FIG. 4 illustrates a receiver side terminal according to an embodiment of the present invention.

FIG. 4 illustrates a receiver side terminal according to an embodiment of the present invention.

Referring to FIG. 4, the receiver side terminal includes a communication unit 210, an input 220, an audio processor 230, a display 240, a memory 250, and a controller 260.

When receiving a call connection request message from the transmitter side terminal 100, the receiver side terminal transfers communication service information or a communication service list to the transmitter side terminal 100. In this case, the receiver side terminal may transmit the communication service information to the transmitter side terminal 100 in a P2P scheme, according to a policy of the communication service device 300.

The receiver side terminal provides the communication service information to the communication service device 300, and requests that corresponding communication service information to be provided to the transmitter side terminal 100. Then, as described above, the communication service device 300 may provide the communication service information to the transmitter side terminal 100, in a previously defined format.

Accordingly, the communication unit 210 forms a communication channel with the communication service device 300. The communication unit 210 receives the call connection request message of the transmitter side terminal 100 from the communication service device 300. Further, the communication unit 210 supports channel formation for transmitting communication service information stored in the memory 250, according to a policy of the communication service device 300. The communication unit 210 forms a communication channel with the communication service device 300, and is similarly constructed as the communication unit 110, as described above.

In addition, the communication unit 210 may provide the above-described limited information to the communication service device 300. Accordingly, the communication unit 210 transfers a communication service list and communication service information for each transmitter side terminal 100 to be provided to the communication service device 300.

The input 220 generates an input signal for operating the receiver side terminal. The input 220 may include a button, a side key, and/or a home key. When the display 240 is provided in the form of a touch screen, the input 220 may be configured in the form of a touch map output on the display 240.

The input 220 may generate various input signals, for example, signals for generating and managing content, such as a micro blog service or a personal broadcasting service. The input 220 may generate a message and an e-mail activated according to selection of the transmitter side terminal 100, and an input signal for operating a chatting service according to a user operation.

When the transmitter side terminal 100 selects a voice call connection or a video call connection, the input 220 may generate an input accepting a communication service corresponding thereto. An input signal generated from the input 220 is transferred to the controller 260 so that the input signal is applied to an operation of a communication service.

The audio processor 230 includes a speaker (SPK) for outputting various audio signals generated in an operation of the receiver side terminal and a microphone (MIC) for collecting an audio signal during a communication service procedure.

Particularly, when the transmitter side terminal 100 connects and uses a communication service, the audio processor 230 outputs a guide sound or an effect sound reporting this. For example, the audio processor 230 may output a guide sound or an effect sound with respect to reception of a call connection request message of the transmitter side terminal 100.

When the transmitter side terminal 100 selects a service from the available communication services, the audio processor 230 may output a guide sound or an effect sound reporting the selection. The output of the guide sound or the effect sound may be omitted according to a user setting of the receiver side terminal or may be substituted by other reporting, for example, a vibration or lamp lighting.

The display 240 outputs various user screens according to an operation of the receiver side terminal. For example, the display 240 outputs an idle screen, a menu screen, a screen to which a lock screen is applied for an operation procedure of the receiver side terminal, and a screen according to operation of various user functions.

Particularly, the display 240 provides various screens for operating a communication based service. For example, the display 240 outputs a screen for setting communication service information, a screen for registering or transmitting the generated communication service information to the communication service device 300, and a communication service support screen selected by the transmitter side terminal 100.

The memory 250 stores various application programs for operating the receiver side terminal. For example, the memory 250 may store an operating system for operating the receiver side terminal, a file playback program, a file search program, a file edit program, and a web access program selectively included according to presence of function support of the receiver side terminal.

Particularly, the memory 250 stores communication service information and a communication service program 251 that supports a communication service.

The communication service program 251 includes a communication service information setting routine and a communication service information providing routine. The communication service information setting routine may include a routine for generating a communication service and a routine for generating a communication service list. The routine for generating a communication service may include a routine for setting or generating at least one of a voice or text message service, an e-mail service, a chatting service, a voice call service, a video call service, a micro blog service, and a personal broadcasting service included in a communication service or receiving and setting the at least one service from an external other terminal.

The routine for generating a communication service list generates a list including at least one generated communication service. The routine for generating a communication service list generates a plurality of lists having different types of communication services according to a user setting. The list including different communication services may be differently provided according to limited information settings and a connected transmitter side terminal 100.

The communication service information providing routine may directly provide the communication service information and provide the communication service information through the communication service device 300 according to a policy of the communication service device 300 or a user setting of the receiver side terminal. The communication service information providing routine may be configured in the form of an agent for supporting the communication service, and the agent may be activated upon activation of a communication function and support signal processing to perform supporting of the communication service.

The communication service information includes at communication service information and/or a communication service list. The communication service information includes various program information for supporting a communication specific service, and content information registered in a corresponding program. For example, for a message service, an e-mail service, a chatting service, and a communication based service including a voice or video call service, the communication service information does not include separate content but includes program information for supporting a corresponding function.

For a communication service including a micro blog service or a personal broadcasting service, the communication service information may include program information for supporting a corresponding function and content information for supporting a corresponding function. That is, for a micro blog service, the communication service information may include image or audio file content, previously registered by the user.

For a personal broadcasting service, audio file content registered by the user may be included with program information for supporting a corresponding service.

A message, an e-mail, or chatting information recorded by transceiving a message service, an e-mail service, or a chatting service may be included in the communication service information with program information for supporting a corresponding function.

The communication service list allows a user of the transmitter side terminal 100 to select at least one of the communication services supported from the receiver side terminal. The communication service list may be differently configured by transmitter side terminals 100, according to a user setting of the receiver side terminal. Accordingly, a list capable of selecting all of the communication services may be provided to a specific transmitter side terminal among a plurality of transmitter side terminals.

Similarly, a list capable of selection only some of the communication services may be provided to a transmitter side terminal, which is not designated by the user or a specially designated transmitter side terminal. A specific communication service, for example, only a voice call service, may be allocated to the specific transmitter terminal as default according to a user setting.

A list including all the communication based services may be provided to transmitter side terminals not designated by the user according to a business strategy or a reporting policy of a user of the receiver side terminal 200.

The controller 260 processes and transfers signals for operating the receiver side terminal. Particularly, the second controller 260 processes signals necessary to support the communication based service and transfers the processed signals.

Figure 5:
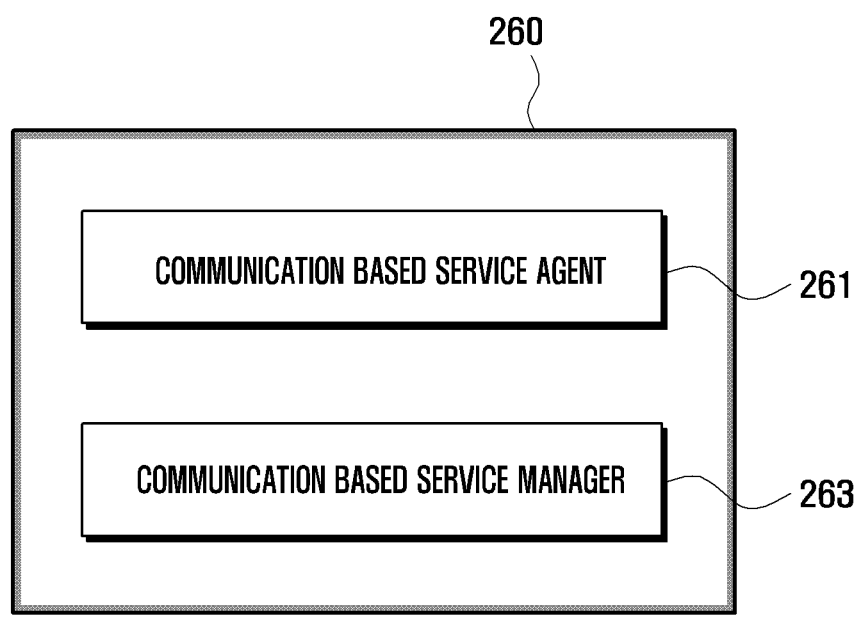
FIG. 5 illustrates a controller of a receiver side terminal according to an embodiment of the present invention.

FIG. 5 illustrates a controller of a receiver side terminal according to an embodiment of the present invention.

Referring to FIG. 5, the controller 260 includes a service agent 261 and a communication service manager 263.

The communication service agent 261 supports processing and transferring of signals for supporting a communication service of the present invention. Particularly, when receiving a phone number based call connection request message from the transmitter side terminal 100, the communication based service agent 261 may transfer a communication service list. The communication service agent 261 directly transfers the communication service list in a P2P scheme or provides the communication service list to the communication service device 300, so that the communication service device 300 can transfer the communication service list to the transmitter side terminal 100.

When receiving an input signal for selecting a communication specific service from the transmitter side terminal 100, the communication service agent 261 directly provides communication service information to the receiver side terminal 200 in a P2P scheme in order to support the selected communication service, transfers the communication service information to the communication service device 300 so that the information is requested to be provided to the transmitter side terminal 100. In this procedure, the communication service agent 261 may control such that different lists and information are provided to transmitter side terminals, based on previously defined limited information.

When the receiver side terminal 200 receives a call connection request message from the transmitter side terminal 100, the communication service agent 261 is activated, and then performs a procedure for providing communication service information according to a policy. The communication service agent 261 may support processing and transferring of signals for operating a communication service designated by the transmitter side terminal 100.

The communication service agent 261 selectively reports a call connection request of the receiver side terminal 200 according to a selected type of communication service. The communication service agent 261 stops a communication service provided when a corresponding acceptance event is generated according to previous setting, or stops or maintains the communication service according to a request of the transmitter side terminal 100.

Accordingly, when the transmitter side terminal 100 requests a call connection, the communication service agent 261 supports the receiver side terminal 200 to use a communication specific service in an idle state, before the acceptance of corresponding call connection. If the call connection is accepted, the communication service agent 261 may pause or terminate the communication service.

The communication service manager 263 manages generation, storage, and updating of communication service information, communication service lists, and limited information. The communication service manager 263 may selectively manage at least one of communication service related information to be registered in the communication service device 300 and communication service related information to be stored in the receiver side terminal 200 according to a policy for supporting a communication service of the present invention.

For example, when the communication service device 300 processes information according to the supporting of a communication service of the present invention and transfers the processed information, the communication service manager 263 may register the communication service information in the communication service device 300 under the control of the user of the receiver side terminal 200.

The communication service manager 263 may upgrade communication service information registered in the communication service device 300 according to a request of a user of the receiver side terminal 200. For example, the communication service manager 263 may manage communication a service list that is previously registered in the communication service device 300, limited information of an available communication service by transmitter side terminals, and content upgrade information of a specific communication service.

Communication service items, which the receiver side terminal 200 may provide, may vary by terminal grade or program installation of the user of the receiver side terminal 200. Accordingly, when communication service items vary, the communication service manager 263 may vary list information registered in the communication service device 300 according thereto. Because a communication service available by the transmitter side terminal 100 may vary according to user setting, when the user setting varies, the communication service manger 263 may control the information registered in the communication service device 300 to vary.

For a micro blog service or a personal broadcasting service, because corresponding content varies according to user settings, if the content varies, the communication service manager 263 is applicable to the communication service device 300. For example, the communication service manager 263 previously registers content of a micro blog in the communication service device 300, and upgrades the content according to user setting or information upgrade of the receiver side terminal 200. When the micro blog is operated based on the receiver side terminal 200, the operation may be omitted. The receiver side terminal 200 may support a personal broadcasting service, i.e., a P2P based Personal Casting (ME-CAST) service.

The communication service manager 263 may apply upgrade of a communication service list stored in the receiver side terminal 200, limited information of an available communication service by transmitter side terminals, and content upgrade information of a specific communication service to information stored in the memory 250.

Figure 6:
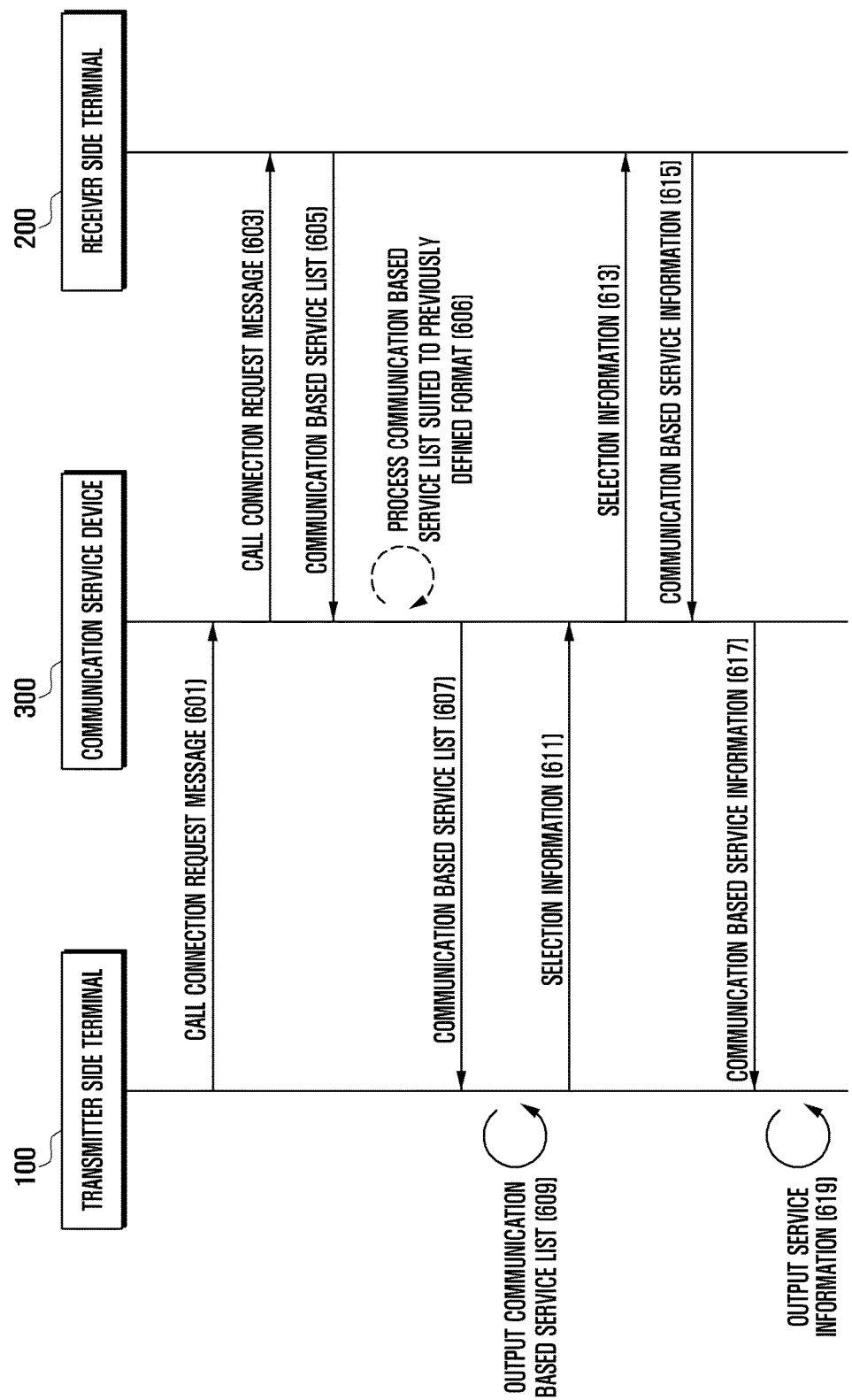
FIG. 6 illustrates a method of performing a communication based service according to an embodiment of the present invention.

FIG. 6 illustrates a method of performing a communication based service according to an embodiment of the present invention.

Referring to FIG. 6, a transmitter side terminal 100 sends a call connection request message to a communication service device 300 in step 601. In step 603, the communication service device 300 transfers a call connection request message (call setup message) to the receiver side terminal 200.

In step 605, the receiver side terminal 200 transfers a communication service list to the communication service device 300. In step 607, the communication service device 300 provides a communication service list to a transmitter side terminal 100. Here, the communication service device 300 may transfer the communication service list, as received from the receiver side terminal 200, or may transmit a corresponding communication service list by processing, in step 606, the communication service list to be suited to a format and standard supported by the transmitter side terminal 100.

In step 609, the transmitter side terminal 100 outputs the communication service list provided from the communication service device 300.

In step 611, when the user selects a specific communication service from the output communication service list, the transmitter side terminal 100 transfers selection information to the communication service device 300. The transmitter side terminal 100 may generate an input signal for terminating a communication service function of the present invention, without selecting a separate communication service. In this case, the transmitter side terminal 100 may transfer an input signal for terminating the communication service to the communication service device 300. Then, the communication service device 300 or the receiver side terminal 200 may terminate the communication service. The transmitter side terminal 100 may output a screen requesting call connection. The receiver side terminal 200 transitions to state for reporting reception of a call connection request message and provides a predetermined guide sound or effect sound and a screen.

In step 613, the communication service device 300 transfers the received selection information to the receiver side terminal 200. In step 615, the receiver side terminal 200 transmits communication service information corresponding to the selection information to the communication service device 300, and in step 617, the communication service device 300 transfers the corresponding communication service information to the transmitter side terminal 100. The communication service device 300 may reprocess a communication service list and communication service information provided from the receiver side terminal 200 to place this information in a format supported by the transmitter side terminal 100.

In step 619, the transmitter side terminal 100 uses a communication service according to the selection information.

As described above, the receiver side terminal 200 provides a communication service list including, e.g., a chatting service function, a micro blog service function, and a personal broadcasting service function, to the transmitter side terminal 100. When the transmitter side terminal 100 transmits selection information selecting a chatting service function, the receiver side terminal 200 processes a signal for forming a chatting channel capable of chatting with the transmitter side terminal 100 with the transmitter side terminal 100 according to a request of the transmitter side terminal 100. When a user of the receiver side terminal 200 accepts a chatting channel formation request of a user of the transmitter side terminal 100, the chatting channel may be formed, or may be automatically be formed without separate acceptance of the receiver side terminal 200. Accordingly, the receiver side terminal 200 and the transmitter side terminal 100 may maintain a chatting program in an idle state.

When the user of the transmitter side terminal 100 selects a micro blog service function, a communication service agent 261 of the receiver side terminal 200 may transmit micro blog service information stored in the memory 250 or link information enabling the receiver side terminal 200 to connect with an operating micro blog to the transmitter side terminal 100. If receiving corresponding information, the transmitter side terminal 100 may output the corresponding information or support process for connecting to corresponding link information. During this procedure, the receiver side terminal 200 may output an alarm according to reception of the call connection request message.

When the receiver side terminal 200 accepts a call connection request, a corresponding acceptance message may be transmitted to the transmitter side terminal 100. The transmitter side terminal 100 and the receiver side terminal 200 may form a voice or video call channel according to an acceptance message. During this procedure, transmission of micro blog service information transferred to the transmitter side terminal 100 may stop. The micro blog service information may be continuously provided according to a request of the transmitter side terminal 100.

As described above, when the transmitter side terminal 100 attempts call connection with the receiver side terminal 200, the transmitter side terminal 100 may selectively use one of various communication services provided from the receiver side terminal 200, while waiting for the user of the receiver side terminal 200 to accept the call.

Although FIG. 6 illustrates the receiver side terminal 200 confirming the call connection request message, an alarm with respect to a corresponding message may be performed according to selection of a user of the transmitter terminal 100. That is, the receiver side terminal 200 provides a voice call service, a video call service, a chatting service, a message service, a micro blog service, and a personal broadcasting service to be included in the call based service list. When selecting the voice call service and the video call service, the receiver side terminal 200 may output alarm according to the call connection request message.

Figure 7:
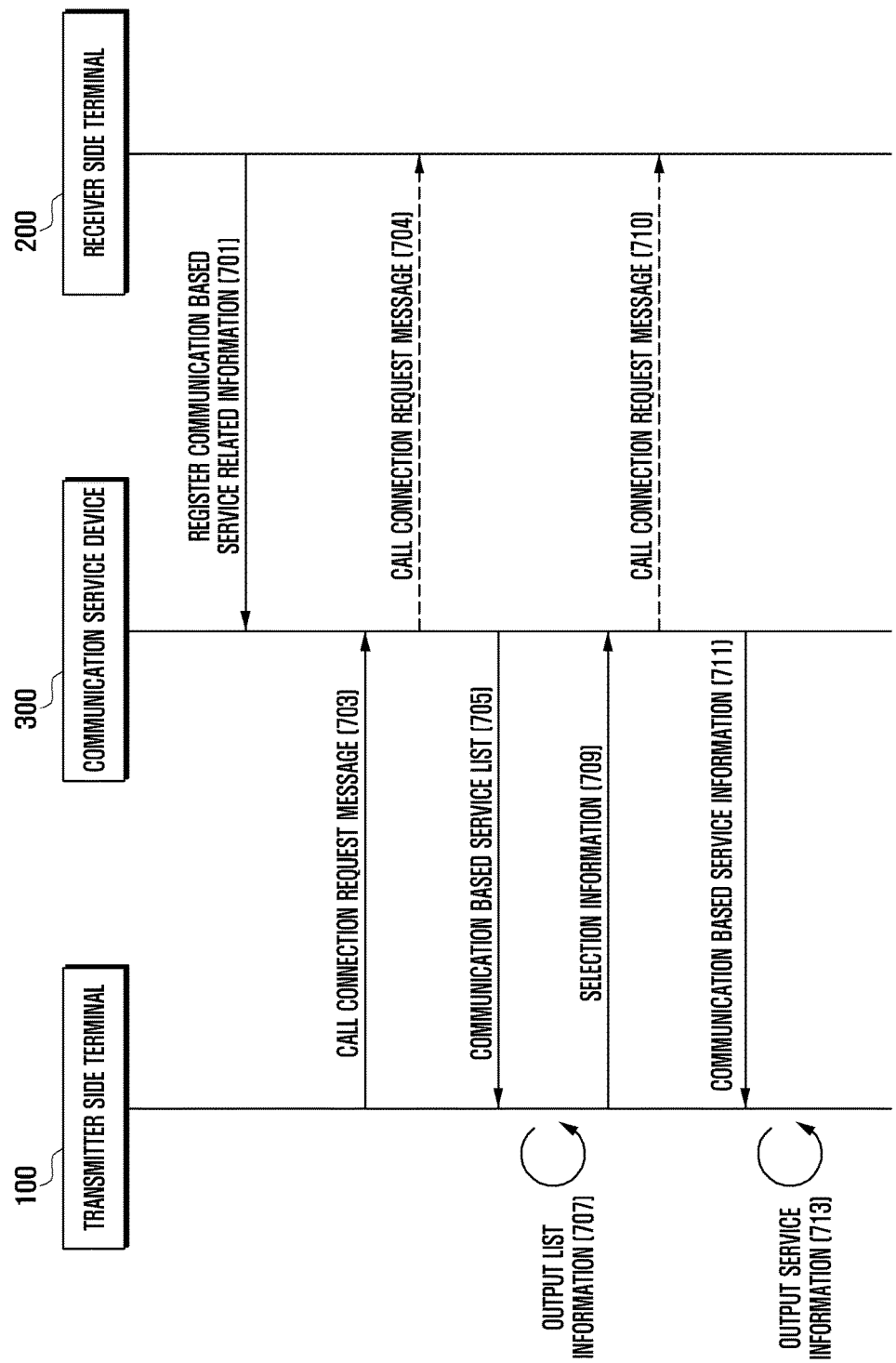
FIG. 7 illustrates a method of performing a communication based service according to an embodiment of the present invention.

FIG. 7 illustrates a method of performing a communication based service according to an embodiment of the present invention.

Referring to FIG. 7, a receiver side terminal 720 registers communication service information in a communication service device 300 in step 701. The communication service device 300 manages the communication service information based on a phone number of the receiver side terminal 200, e.g., an index.

The communication service information provided from the receiver side terminal 200 may include a communication service list of communication services provided from the receiver side terminal 200 and communication service information for supporting respective services. For example, the communication service list may include a message service, an e-mail service, a chatting service, a call service, a micro blog service, and a personal broadcasting service. The communication service information may include information to transmit a message or an e-mail to the receiver side terminal 200, for example, at least one of a phone number or an e-mail address of the receiver side terminal 200, a specific chatting ID of the receiver side terminal 200 for supporting a call service, various content information or micro blog accessible link information constituting a micro blog for supporting a micro blog service, and audio file information for supporting a personal broadcasting service. The receiver side terminal 200 may perform a procedure of subscribing to a specific service provided from the communication service device 300 to support the communication service of the present invention.

In step 703, the communication service device 300 receives a call connection request message from the transmitter side terminal 100, while supporting a communication service function according to a registration of the receiver side terminal 200. In step 705, the communication service device 300 provides a communication service list for the receiver side terminal 200 to the transmitter side terminal 100.

In step 707, the transmitter side terminal 100 displays the received list. When the user selects a specific service from the list, the transmitter side terminal 100 transmits selection information to the communication service device 300 in step 709. When the user selects a service rejection in the received list, the transmitter side terminal 100 may provide selection information corresponding to use rejection of a service to the communication service device 300. When the user selects a certain service in the received list, the transmitter side terminal 100 may provide selection information corresponding to a call connection service or a message service to the communication service device 300. In this case, the transmitter side terminal 100 may output a default screen provided from the communication service device 300 or a default call connection screen and a message creation screen supported from the transmission side terminal 100.

Accordingly, the communication service device 300 may transfer the call connection request message to the receiver side terminal 200. The receiver side terminal 200 may output an alarm according to reception of the call connection request message as a guide sound, an effect sound, vibration, and lamp lighting. For a message service, the communication service device 300 may transmit a message created from the transmission side terminal 100 to the receiver side terminal 200.

In step 711, the communication service device 300 provides communication service information corresponding to the selection information to the transmitter side terminal 100. That is, the communication service device 300 provides content information corresponding to the selection information, such as a micro blog service or a personal broadcasting service, to the transmitter side terminal 100.

After receiving communication service information corresponding to the selection information, the transmitter side terminal 100 outputs the communication based service information in step 713.

When the transmitter side terminal 100 selects an e-mail service or a chatting service, the communication service device 300 may provide an e-mail address or chatting ID associated with the receiver side terminal 200 to a corresponding transmitter side terminal 100. When a specific chatting program is installed in the transmitter side terminal 100 to support a chatting service, the communication service device 300 may provide chatting program information according to a request of the transmitter side terminal 100.

When receiving a call connection request image according to a policy or setting of the receiver side terminal 200 in step 703, the communication service device 300 may transfer a corresponding call connection request message to the receiver side terminal 200 separately from supporting of the communication based service of the present invention in step 704. Alternatively, when transfer of a call connection request message is requested according to service selection information of the transmitter side terminal 100 in step 709, the communication service device 300 may transfer a corresponding call connection request message to the receiver side terminal 200 in step 710.

Figure 8:
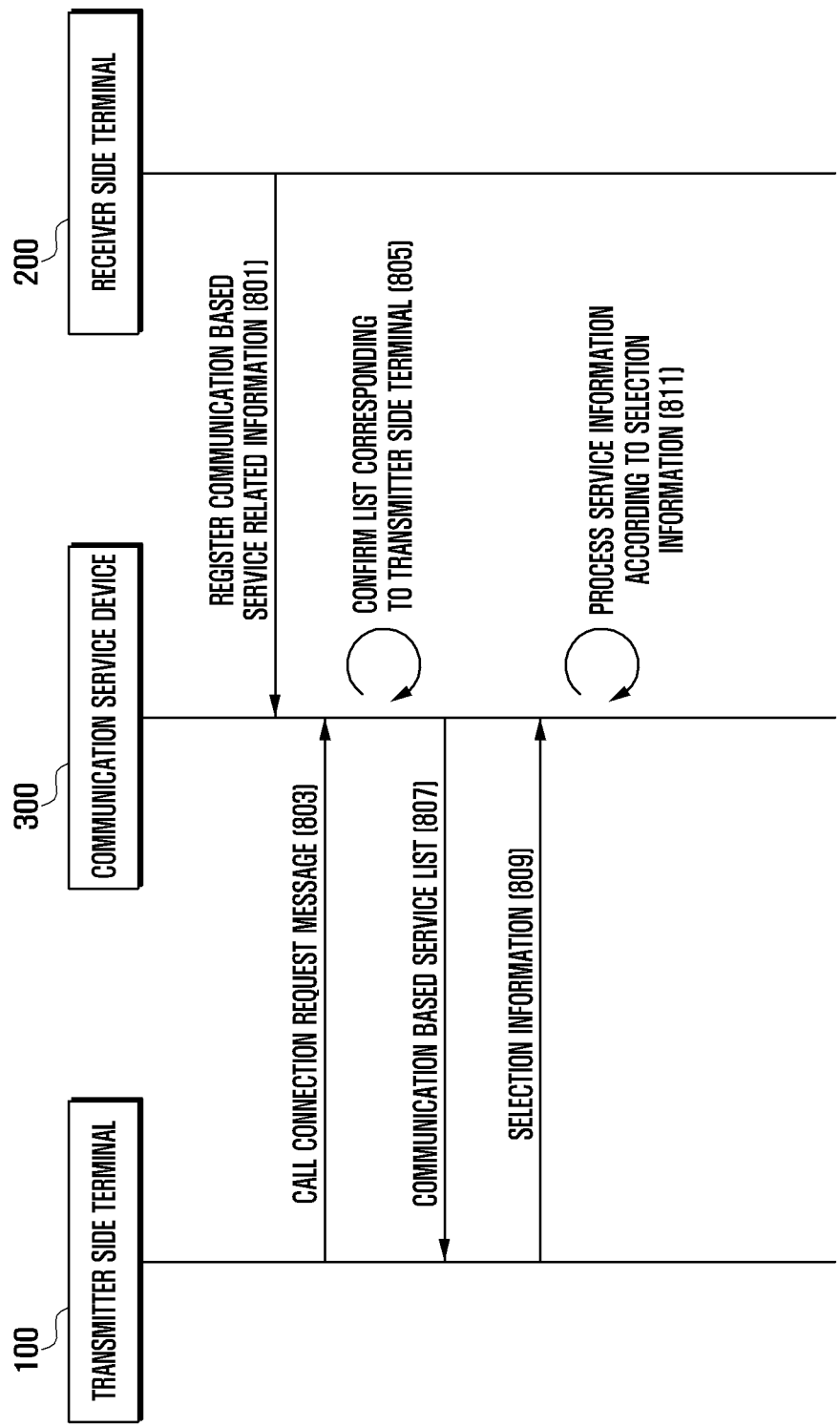
FIG. 8 illustrates a method of performing a communication based service according to an embodiment of the present invention.

FIG. 8 illustrates a method of performing a communication based service according to an embodiment of the present invention.

Referring to FIG. 8, the receiver side terminal 200 registers limited information and communication service information in a communication service device 300 in step 801. For example, the limited information includes information for limiting types of communication services provided by transmitter side terminals 100.

For example, the receiver side terminal 200 may configure limited information such that a communication service list capable of selecting only a chatting service, a micro blog service, a message service, or an e-mail service is provided to a transmitter side terminal 100. As another example, the receiver side terminal 200 may configure limited information such that a communication service list capable of selecting only a message service, an e-mail service, a chatting service, or a call service is provided. Further, the receiver side terminal 200 may configure limited information such that a communication service list capable of selecting specific services, for example, only a call service and a personal broadcasting service is provided to a transmitter side terminal 100 having a phone number which is not previously designated. To configure the limited information, the receiver side terminal 200 provides a screen interface for configuring the limited information or the communication service device 300 may provide a screen interface for configuring the limited information to the receiver side terminal 200.

In step 803, the communication service device 300 receives a call connection request message, based on a phone number of the receiver side terminal 200, from the transmitter side terminal 100. In step 805, the communication service device 300 confirms a phone number of the transmitter side terminal 100 to confirm a communication service list corresponding to the transmitter side terminal 100, and in step 807, transmits a corresponding communication service list to the transmitter side terminal 100.

In step 809, the transmitter side terminal 100 provides selection information selecting a specific communication service, and in step 811, the communication service device 300 processes corresponding information, such that a communication service corresponding to selection information is performed. For example, the communication service device 300 may provide content information to the transmitter side terminal 100, when a micro blog service is selected, and may form a chatting channel when the channel service is selected.

When receiving a call connection request message from the transmitter side terminal 100, the communication service device 300 directly transfers a corresponding call connection request message to the receiver side terminal 200 according to a policy, or determines whether or not to transfer the corresponding call connection request message according to selection information selected by the transmitter side terminal 100. For example, when a call service is selected from the communication service list, the communication service device 300 transmits the call connection request message to the receiver side terminal 200. Further, when another service is selected, the communication service device 300 may control such that the call connection request message is not transferred.

Figure 9:
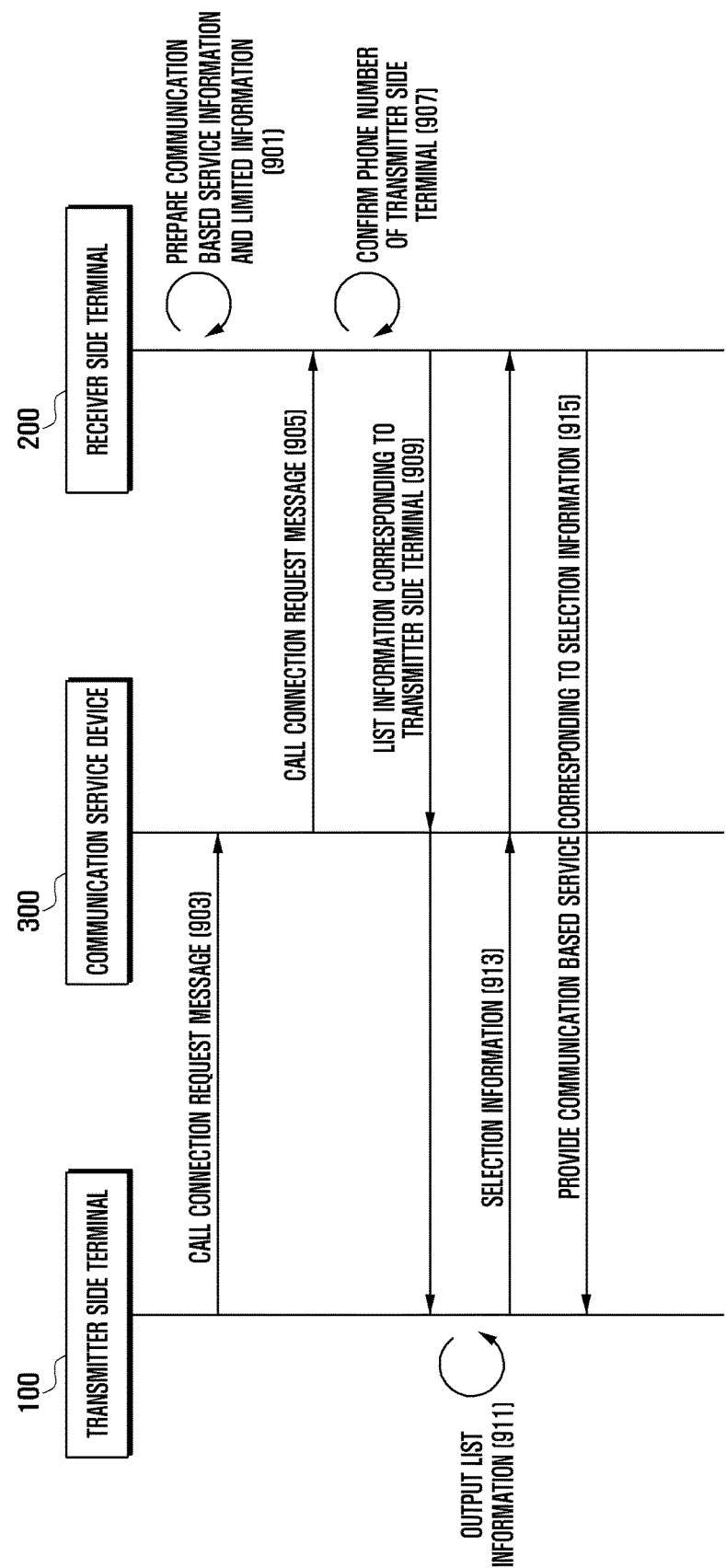
FIG. 9 illustrates a method of performing a communication based service according to an embodiment of the present invention.

FIG. 9 illustrates a method of performing a communication based service according to an embodiment of the present invention.

Referring to FIG. 9, the receiver side terminal 200 prepares communication service information and limited information in step 901. For example, the receiver side terminal 200 prepares various content information related to communication services and information for installing, executing, and connecting a program as communication service information. That is, the communication service agent of the receiver side terminal 200 may operate a communication service prepared by the receiver side terminal 200, corresponding to a call connection request message of the transmitter side terminal 100. During this procedure, the receiver side terminal 200 sets limited information, wherein communication services provided to transmitter side terminals are differently set.

In step 903, the transmitter side terminal 100 transmits a call connection request message to the communication service device 300, and in step 905, the communication service device 300 transfers a corresponding call connection request message to the receiver side terminal 200.

In step 907, the receiver side terminal 200 confirms a phone number of the transmitter side terminal 100 from the corresponding call connection request message. The receiver side terminal 200 identifies limited information associated with the transmitter side terminal 100 in order to extract a communication service list corresponding to the phone number of the transmitter side terminal 100. In step 909, the receiver side terminal 200 transmits the communication service list to the transmitter side terminal 100 through the communication service device 300.

In step 911, the transmitter side terminal 100 outputs the communication service list.

In step 913, the transmitter side terminal 100 transmits selection information identifying a specific communication service to the receiver side terminal 200 through the communication service device 300. In step 915, the receiver side terminal 200 provides a communication service with the transmitter side terminal 100, corresponding to the selection information.

The receiver side terminal 200 may perform or omit an alarm in response to a connection request according to user setting or the selection information. For example, when receiving the call connection request message from the transmitter side terminal 100, the receiver side terminal 200 may alarm the call connection request message and support a communication based services according to selection information provided from the transmitter side terminal 100.

When selection information from the transmitter side terminal 100 identifies a call service, the receiver side terminal 200 performs an alarm according to a call connection request. When the user selects another service, for example, a message service, an e-mail service, a micro blog service, or a personal broadcasting service, the receiver side terminal 200 may omit the alarm according a separate call connection request. When the micro blog service or the personal broadcasting service is selected, the receiver side terminal 200 may perform an alarm according to a call connection request and omit corresponding alarm with respect to the message service or the e-mail service. The alarm according to a call connection request may be variously adjusted according to user setting or intention of a designer. When the transmitter side terminal 100 selects a chatting service, the receiver side terminal 200 may activate a chatting function and output a chatting message created from the transmitter side terminal 100. In this case, the receiver side terminal 200 may omit an alarm according to a separate call connection request.

Figure 10:
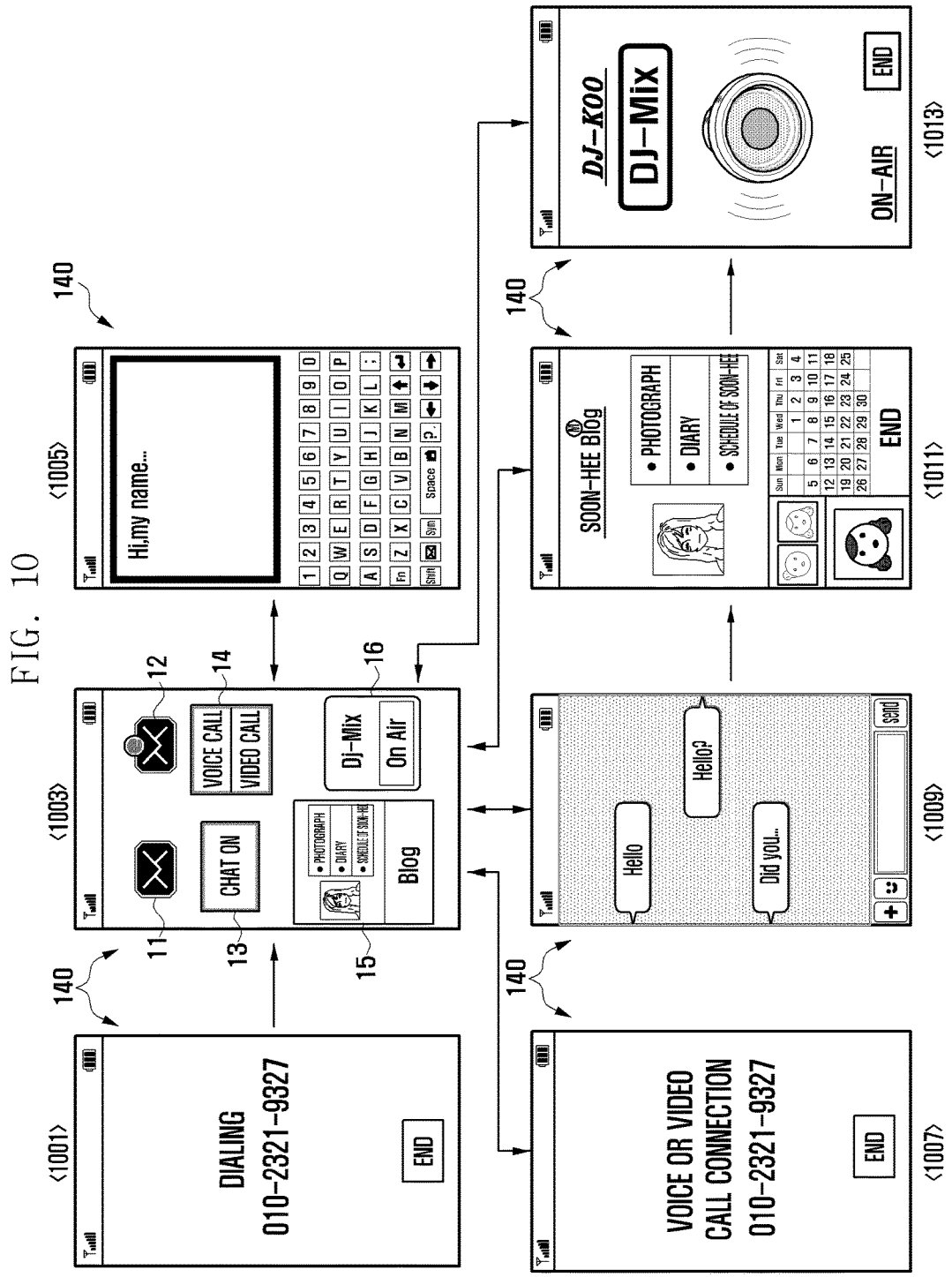
FIG. 10 illustrates examples of screens output from a transmitter side terminal according to an embodiment of the present invention.

FIG. 10 illustrates examples of screens output from a transmitter side terminal according to an embodiment of the present invention.

Referring to FIG. 10, the transmitter side terminal 100 dials the number of a receiver side terminal 200 booking screen 1001. That is, the transmitter side terminal 100 requests transmits a call connection request message to the receiver side terminal 200, through the communication service device 300.

In this case, the display 140 of the transmitter side terminal 100 outputs a corresponding screen 1001. A termination (END) button may be provided at a dialing screen to cancel dialing. The dialing screen 1001 in include a region to which a phone number or phone book information of the receiver side terminal 200 are output.

When receiver side terminal 200 supports the above-described communication services, the transmitter side terminal 100 outputs a communication service list screen 1003 on the display 140. The communication service list is provided by the communication service device 300 or the receiver side terminal 200 according to a service support policy of the present invention.

The communication service list in FIG. 10 illustrates six services, which may be selected by the user. Accordingly, the display 140 outputs the screen 1003, which allows the user to select a message service item 11, an e-mail service item 12, a chatting item 13, a call service item 14, a micro blog service item 15, and a personal broadcasting service item 16. The call service item 14 is provided for selecting one of a voice call or an video call. Further, the list information screen may vary according to a type of service provided from the receiver side terminal 200.

When the message service item 11 or the e-mail service item 12 is selected from the screen 1003, the display 140 outputs a message creation screen or an e-mail creation screen, as illustrated in a screen 1005, which includes a character input window and an input character output window.

If the message creation and the e-mail creation are terminated, so that a user generates an input signal indicating termination of the message creation and the e-mail creation, even if additional input of a phone number or an e-mail address is not performed, a corresponding message may be transmitted to the receiver side terminal 200.

When the e-mail service item 12 is selected, the transmitter side terminal 100 may collect previously stored e-mail address information corresponding to the receiver side terminal 200 or e-mail address information provided from the receiver side terminal 200.

After creation of the message or the e-mail is terminated and transmitted, the transmitter side terminal 100 may return to screen 1003 or perform a communication function related termination. In screen 1003, the call connection request message is provided to the receiver side terminal 200 so that the receiver side terminal 200 may output an alarm according to a call connection request. The receiver side terminal 200 may output an alarm according to the call connection request in response to service selection of a user of the transmitter side terminal 100. That is, if the user of the transmitter side terminal 100 outputs an alarm according to a call connection request or selects the call service item 14, upon selection of a specific service item, the receiver side terminal 200 may output an alarm according to a call connection request.

When the call service item 14 is selected from screen 1003, the transmitter side terminal 100 requests a voice or video call connection from the receiver side terminal 200, as illustrated in screen 1007.

When the chatting service item 13 is selected from the screen 1003, a chatting service screen is output in screen 1009. In this case, the chatting service screen may also be output on the display 240 of the receiver side terminal 200. Further, if the chatting service item 13 is selected, the transmitter side terminal 100 may confirm a previous channel history and output the previous channel history on the display 140.

When the micro blog service item 15 is selected from screen 1003, the transmitter side terminal 100 outputs micro blog content information provided from the receiver side terminal 200, as illustrated in screen 1011. The micro blog content information may be stored in a memory of the receiver side terminal 200 or provided from the communication service device 300, after being previously registered in the communication service device 300 by the receiver side terminal 200.

FIG. 10 illustrates one example of a screen, which may be configured according to micro blog contents information. A screen of outputting the micro blog contents information may vary according to setting of a user of the receiver side terminal 200. The user of the transmitter side terminal 100 may read various data, for example, photographs, weather, schedule information of the user such as day, week, and month registered by the user of the receiver side terminal 200 through the micro blog contents information according to presence of user setting of the receiver side terminal 200.

When the personal broadcasting service item 16 is selected from screen 1003, the transmitter side terminal 100 outputs a personal broadcasting screen provided from the receiver side terminal 200 on the display 140, as illustrated in screen 1013. The personal broadcasting service allows a user of the receiver side terminal 200 to output a previously registered audio file or an audio file broadcasted in real time. The corresponding audio file may be a file directly generated by the receiver side terminal 200 in real time or a file registered in the communication service device 300.

The micro blog service and the personal broadcasting service may be a service of being registered in the communication service device 300. Further, the micro blog service and the personal broadcasting service may be configured in the form of a one to one type service such as Point to Point (P2P) type service between the receiver side terminal 200 and the transmitter side terminal 100.

As illustrated in FIG. 10, the transmitter side terminal 100 may use various communication services provided from the receiver side terminal 200, based on a phone number. The communication service function of the present invention may wait to use the call function, while using a communication service provided from the receiver side terminal 200, and may use a specific service according to setting or a service policy without waiting for a separate call.

Figure 11:
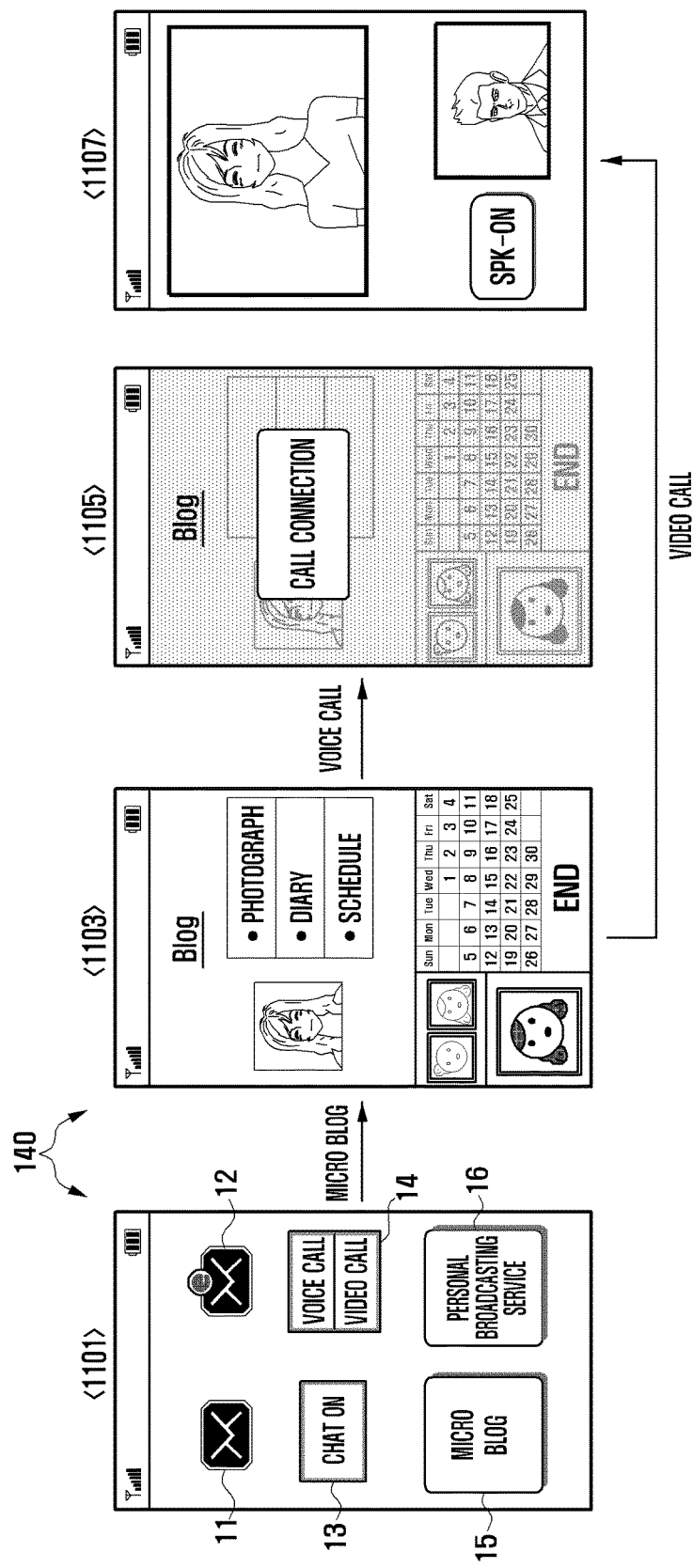
FIG. 11 illustrates examples of screens output during a call connection according to an embodiment of the present invention.

FIG. 11 illustrates examples of screens output during a call connection according to an embodiment of the present invention.

Referring to FIG. 11, when call connection is requested, the transmitter side terminal 100 outputs a communication service list screen 1101, similar to screen 1003 in FIG. 10, and described above.

When the transmitter side terminal 100 requests a call connection to the receiver side terminal 200, as illustrated in a screen 1001 of FIG. 10, before screen is displayed 1101, the receiver side terminal 200 may perform an alarm according to a call connection request. That is, while screen 1103 is output in the display 140 of the transmitter side terminal 100, the receiver side terminal 200 may perform an alarm according to the call connection request.

When the receiver side terminal 200 accepts call connection, the transmitter side terminal 100 outputs a screen indicating voice call connection on the display 140, as illustrated in screen 1105. Thereafter, the screen is changed according to a type of call service, e.g., a screen corresponding to a video call connection is displayed, as illustrated in screen 1107. Generally, to connect the video call, each of the transmitter side terminal 100 and the receiver side terminal 200 include a camera.

The transmitter side terminal 100 may continuously maintain a micro blog service screen while performing a voice call connection on the screen 1105. Particularly, because of the user usually does not look when holding the terminal during a voice call, the transmitter side terminal 100 may maintain the micro blog service but block power supply of the screen.

When the call connection is terminated or the state of the terminal is changed by an arranged proximity sensor, the transmitter side terminal 100 may support power supply of a screen to view a micro blog screen 1103 again.

Alternatively, when an earphone is connected or speaker phone option is selected during a voice call connection, the transmitter side terminal 100 may maintain the micro blog service screen. Thereafter, the user may perform voice call while searching the micro blog service screen 1103.

For the video call screen 1107, because images, such as face images of a caller and a speaker collected by a camera are output, the micro blog service screen may be terminated or removed from the first display unit 140 in a pause state. If the video call is terminated in the pause state, the transmitter side terminal 100 may again output the corresponding micro blog service screen 1103 on the display 140.

When a voice or video call connection is performed while the personal broadcasting service is being performed, the transmitter side terminal 100 may continuously maintain, pause, or terminate the corresponding personal broadcasting service.

To continuously maintain the personal broadcasting service during the call, the transmitter side terminal 100 may use an audio file provided through the personal broadcasting service as a background audio. In this case, the transmitter side terminal 100 may automatically reduce a volume of the personal broadcasting service to predetermined magnitude or below, so that the user may recognize a transceived voice.

The provided personal broadcasting service may also be a previously registered audio file. Accordingly, an audio file for the personal broadcasting service may be further provided to the receiver side terminal 200. As a result, when the same audio file is provided to the transmitter side terminal 100 and the receiver side terminal 200 as a background audio, the call connection may be performed.

When the personal broadcasting service is paused to support the call connection, the transmitter side terminal 100 may resume the personal broadcasting service, when the voice call connection is terminated.

Figure 12:
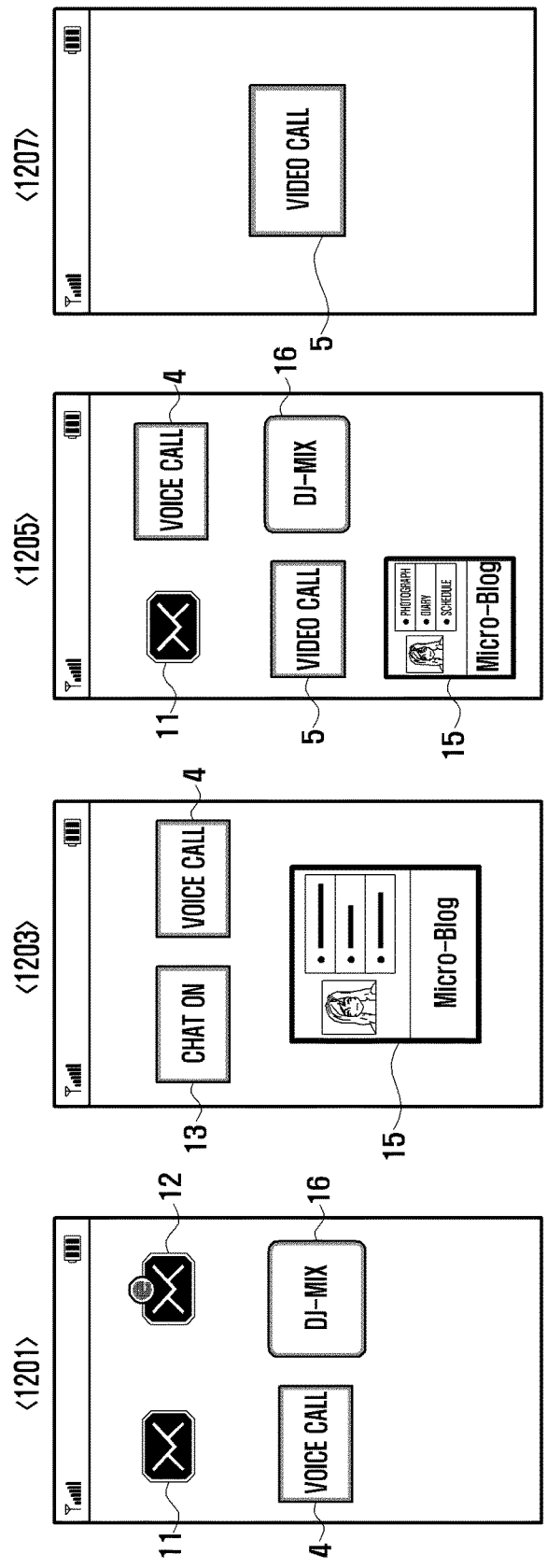
FIG. 12 illustrates various communication based service lists according to an embodiment of the present invention.

FIG. 12 illustrates various communication based service lists according to an embodiment of the present invention.

Referring to FIG. 12, the transmitter side terminal 100 outputs various communication service list screens according to the settings of the receiver side terminal 200. For example, the transmitter side terminal 100 may output a communication service list screen 1201 including a message service item 11, an e-mail service item 12, a voice call service item 4, and a personal broadcasting service item 16. The transmitter side terminal 100 may output a communication service list screen 1203 including a chatting service item 13, a voice call service item 4, and a micro blog service item 15. The transmitter side terminal 100 may output a communication service list screen 1205 including a message service item 11, a voice call service item 4, an video call service item 5, a personal broadcasting service item 16, and a micro blog service item 15. Further, the transmitter side terminal 100 may output a communication service list screen 1207 including only the video call service item 5.

The respective communication based service list screens may vary according the types of communication services supported by the receiver side terminal 200 and/or user preferences.

Accordingly, although the receiver side terminal 200 may support all of the listed service items, the service items may be restrictively provided to users of specific transmitter side terminals 100 according to user settings. For example, the receiver side terminal 200 may limit specific service items being used by certain users, at certain times, by certain devices, etc.

When one communication service item is set to a specific transmitter side terminal 100, as illustrated in screen 1207, output of a separate list information screen may be omitted. Basically, the transmitter side terminal 100 receives a command to perform call connection with a user of the receiver side terminal 200 using only a designated video call service item 5.

Figure 13:
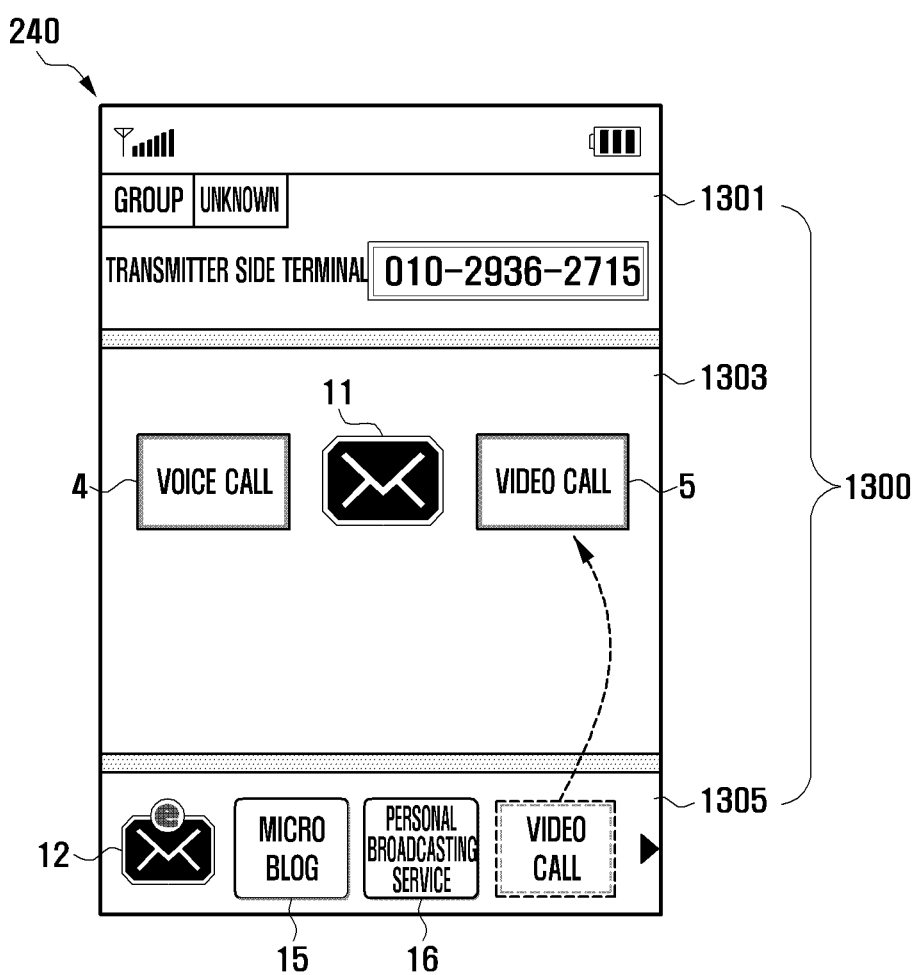
FIG. 13 illustrates an example of a limited information setting screen that is output from a receiver side terminal according to an embodiment of the present invention.

FIG. 13 illustrates an example of a limited information setting screen that is output from a receiver side terminal according to an embodiment of the present invention.

Referring to FIG. 13, the receiver side terminal 200 provides a limited information setting screen interface 1300 according to a communication based service support policy. The limited information setting screen interface 1300 includes a service use terminal designating region 1301 for inputting a phone number of the transmitter side terminal 100, a registration region 1303 for registering various communication services that the transmitter side terminal 100 may select, and a service list region 1305 listing the communication based services that the receiver side terminal 200 may provide.

Using the limited information setting screen interface 1300, the user of the receiver side terminal 200 may distinctly set communication services for specific transmitter side terminals or specific transmitter side terminal groups. For example, the user of the receiver side terminal 200 may set such that the service use terminal designating region 1301 receives list information including currently set communication based service items. An individual number may be input to the service use terminal designating region 1301 and group designation is possible according to user selection. The group designation is possible using a phone book list stored in a phone book and groups previously recorded in a corresponding phone book list may be designated using the service use terminal designating region 1301. To this end, the user may select a "group" tab output on the service use terminal designating region 1301. In this case, the receiver side terminal 200 may output a list of groups stored in the phone book list on the service use terminal designating region 1301 or on the second display unit 240 in a pop-up scheme or as a separate layer.

Additionally, the user may set communication based service list information to be provided to a transmitter side terminal in which a phone number is not designated. To this end, the user may select a "unknown" tab of the service use terminal designating region 1301. If the "unknown" tab is selected, upon reception of a call connection request message from a transmitter side terminal having a phone number which not separately designated, the user of the receiver side terminal 200 may set communication based service list information to be provided to a corresponding receiver side terminal 100.

To set the communication service list, the user may move at least one of the communication services listed in the service list region 1305, which the receiver side terminal 200 may provide, to the registration region 1303.

Although FIG. 13 illustrates that the at least one of the communication services listed in the service list region is moved, the present invention is not limited thereto. That is, the receiver side terminal 200 may display communication services that the receiver side terminal 200 may support on a registration region 1303 as default, and may set communication based service list information according to an input signal that removes services from the registration region 1303.

Although FIG. 13 illustrates a procedure of setting a voice call service item 4, a message service item 11, and an video call service item 5 among items listed at the service list region 1305, other service items, for example, an e-mail service item 12, a micro blog service item 15, a personal broadcasting service item 16, and an video call service item 5, which are not registered in the registration region 1303 yet are included in the service list region 1305. Additional items may be arranged at a region that is not displayed due to limitation of the size. The user may search service items that are not displayed yet through scroll or selection of a corresponding arrow key, and may move a specific service item to a registration region 1303 according to tastes.

FIG. 14 illustrates an example of a screen for confirming a communication based service usage state that is output from a receiver side terminal according to an embodiment of the present invention.

Referring to FIG. 14, the user of the receiver side terminal 200 confirms information with respect to transmitter side terminal users using a communication service function. To this end, the receiver side terminal 200 provides a function for searching for a corresponding communication service usage state screen. The user may request to output the communication service usage state on the display 240, as illustrated in screen 1401, by selecting a menu corresponding to the function. Here, the receiver side terminal 200 indicates used information of transmitter side terminals by service items. That is, as shown, the receiver side terminal 200 outputs information corresponding to the number of times users of transmitter side terminals have used the message service item 11 to one side of an image or an icon indicated by a corresponding message service item 11 or an adjacent region thereof.

In the same manner, the receiver side terminal 200 may output the usage information of the transmitter side terminals using the e-mail service item 12, the voice call service item 4, the chatting service item 13, the micro blog service item 15, and the personal broadcasting service item 16 to a predetermined region of a location to which an image or an icon corresponding to the service items is output. The user may confirm how many users use the information in any service item through the communication service usage state screen.

For example, when the user selects the micro blog service item 15, the receiver side terminal 200 displays corresponding usage state information in detail, as illustrated in screen 1403.

For example, the receiver side terminal 200 outputs the number of times that transmitter side terminals connected to a corresponding service item or at least a part of phone numbers of the connected transmitted side terminals to a visitor region 403. The receiver side terminal 200 also outputs detailed information with respect to connector currently using a service item to a connector region 401.

Displaying information with respect to a corresponding service usage history by the receiver side terminal 200 is one example. At least one of the visitor region 403 and a connector region 401 may be output, and information about content information usage used by connectors or visitors may be further provided.

When the user of the receiver side terminal 200 selects another service item, for example, a message service item 11, the receiver side terminal 200 may provide information of transmitter side terminals using a corresponding message service item 11 in the form of a list. In the same manner, the receiver side terminal 200 may output connection time information of transmitter side terminals using a chatting service item 13 or phone book information or phone number information associated with transmitter side terminals. Preset information of other service items may be provided according a detailed viewing request of the user in the same manner.

As described above, a system and a terminal supporting a communication service function, a function support method, and a user interface therefor according to embodiments of the present invention may use various communication services provided from the receiver side terminal 200, when the transmitter side terminal 100 transmits a connection request to the receiver side terminal 200 using a phone number. Accordingly, the above-described embodiments of present invention allow a user of the transmitter side terminal 100 to select and use at least one of the various communication services provided from the receiver side terminal 200. Further, the above-described embodiments of the present invention support various content information that the user of the receiver side terminal 200 wants to be provided to other terminals, e.g., in the form of a micro blog service or a personal broadcasting service. During this procedure, P2P communication may be used between the transmitter side terminal 100 and the receiver side terminal 200, and may support data transceiving using the communication service device 300 as a server.

The transmitter side terminals and the receiver side terminals may further include various additional modules according to provision forms thereof. That is, the terminals may further constituent elements which are not described such as a near field communicator for near field communication, an Internet communicator for communicating with an interface and an Internet network for data transceiving in a wired or wireless communication scheme to perform an Internet function, and a digital broadcasting module for performing reception and playback functions of digital broadcasting. Because the constituent elements can be variously changed according to convergence trend of a digital device, no elements can be listed. However, the devices may include constituent elements equivalent to the foregoing constituent elements. In the terminals of the present invention, specific constituent elements may be omitted from the foregoing constituent elements or by other constituent elements according to the provision form. This can be commonly apprehended by those skilled in the art.

The terminals according to the embodiment of the present invention may include various information and communication devices such as a Portable Multimedia Player (PMP), a digital broadcasting player, Personal Digital Assistant (PDA), a music player (e.g., MP3 player), a portable game terminal, a smart Phone, a notebook computer, and a handheld Personal Computer (PC), as well as various mobile communication terminals operating based on communication protocols corresponding to various communication systems.

Accordingly, the above-described embodiments of the present invention allow a user to valuably use idle time during a call connection, by allowing a user of a transmitter side terminal to selectively use various communication services provided from the receiver side terminal. Further, the above-described embodiments of the present invention allow the user of the receiver side terminal to provide desired information to users of transmitter side terminals because the user of the receiver side terminal can provide at least one of the various communication services to the users of transmitter side terminals.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A system for supporting a communication service, the system comprising:
    a receiver side terminal that provides a communication service list including communication service items, in response to a call connection request message; and
    a transmitter side terminal that transmits the call connection request message to the receiver side terminal, receives the communication service list provided from the receiver side terminal, and displays the received communication service list, transmits selection information selected from the communication service list, receives communication service information corresponding to the selection information, accepted by the receiver side terminal, from the receiver side terminal, outputs the received communication service information during a call waiting time, and terminates, pauses or background-processes the output of the communication service information and forms a voice or video call channel with the receiver side terminal when the call connection request is accepted, wherein the receiver side terminal is one of a portable multimedia player (PMP), a digital broadcasting player, personal digital assistant (PDA), a music player, a portable game terminal, a smart phone, a notebook computer, and a hand-held personal computer (PC), and the communication service list includes communication services supported by the receiver side terminal.

2. The system of claim 1, wherein the communication services supported by the receiver side terminal comprise at least one of a message service, an e-mail service, a call service, a chatting service, a micro blog service, and a personal broadcasting service.

3. The system of claim 1, wherein the receiver side terminal generates limited information that limits the use of the communication services supported by the receiver side terminal by the transmitter side terminal.

4. The system of claim 3, wherein the receiver side terminal confirms a phone number of the transmitter side terminal to provide the communication service list to the transmitter side terminal, based on the limited information.

5. The system of claim 1, wherein the receiver side terminal provides the communication service list without accepting the call connection request.

6. The system of claim 1, further comprising a communication service device provided between the transmitter side terminal and the receiver side terminal for supporting signal transceiving, wherein the communication service device stores and manages the communication service list and communication based service information provided from the receiver side terminal.

7. The system of claim 6, wherein the communication service device processes the communication service list provided from the receiver side terminal into a form supported by the transmitter side terminal and transfers the processed communication service list to the transmitter side terminal.

8. The system of claim 6, wherein the communication service device transmits, to the transmitter side terminal, communication service information corresponding to selection information received from the transmitter side terminal, based on communication service information previously registered by the receiver side terminal.

9. The system of claim 6, wherein the communication service device receives limited information that limits the use of the communication services supported by the receiver side terminal by the transmitter side terminal, or generates the limited information according to a request of the receiver side terminal.

10. The system of claim 6, wherein when the communication service device receives the call connection request message from the transmitter side terminal, confirms a phone number of the transmitter side terminal to provide a corresponding communication service list to the transmitter side terminal.

11. A method for supporting a communication based service in a system including a transmitter side terminal and a receiver side terminal, the method comprising:

providing, by the transmitter side terminal, a call connection request message to the receiver side terminal by;

providing, by the receiver side terminal, a communication service list to the transmitter side terminal in response to the call connection request message;

outputting, by the transmitter side terminal, the communication service list;

transmitting, by the transmitter side terminal, selection information identifying a specific item selected from the communication service list to the receiver side terminal;

providing, by the receiver side terminal, communication service information corresponding to the selection information, accepted by the receiver side terminal, to the transmitter side terminal;

outputting, by the transmitter side terminal, the communication service information during a call waiting time; and terminating, pausing or background-processing the outputting of the communication service information and forming a voice or video call channel with the receiver side terminal, by the transmitter side terminal, when the call connection request is accepted, wherein the receiver side terminal is one of a portable multimedia player (PMP), a digital broadcasting player, personal digital assistant (PDA), a music player, a portable game terminal, a smart phone, a notebook computer, and a hand-held personal computer (PC), and the communication service list includes communication services supported by the receiver side terminal.

12. The method of claim 11, wherein the communication service list includes at least one of a message service, an e-mail service, a call service, a chatting service, a micro blog service, and a personal broadcasting service.

13. The method of claim 11, further comprising:
accepting, by the receiver side terminal, the call connection in response to the call connection request;
providing a call connection acceptance message to the transmitter side terminal; and
pausing, terminating, or background-processing a communication service performed by the transmitter side terminal, upon receiving the call connection acceptance message.

14. A method of operating a transmitter side terminal supporting a communication service, the method comprising:

transmitting a call connection request message to another terminal;
receiving a communication service list including communication services supported by the another terminal, in response to the call connection request message;
outputting the received communication service list;
selecting a specific communication service from the communication service list;
transmitting selection information identifying the specific communication service to the another terminal;
receiving communication service information corresponding to the selection information accepted by the another terminal;
outputting the received communication service information during a call waiting time; and
terminating, pausing or background-processing the outputting of the communication service information and forming a voice or video call channel with the another terminal when the call connection request is accepted, wherein the another terminal is one of a portable multimedia player (PMP), a digital broadcasting player, personal digital assistant (PDA), a music player, a portable game terminal, a smart phone, a notebook computer, and a hand-held personal computer (PC), and the communication service list includes communication services supported by the another terminal.

15. The method of claim 14, further comprising:
receiving a call connection acceptance message from the another terminal;
pausing, terminating, or background-processing a communication service currently performed by the transmitter side terminal; and
outputting a call service screen.

16. A transmitter side terminal for supporting a communication based service, the transmitter side terminal comprising:
a communication unit that transmits a call connection request message to another terminal, and receives a communication service list including communication services supported by the another device, in response to the call connection request message;
a display that outputs the received communication service list;
an input that generates an input signal for transmitting the call connection request message to the another terminal; and
a controller that controls the transmission of the call connection request message, and the reception and output of the communication service list,
wherein the controller controls the communication unit to transmit selection information corresponding to an input signal received via the input for selecting a specific communication service from the communication service list, and controls the display to display received communication service information corresponding to the selection information accepted by the another terminal during a call waiting time, and to terminate, pause or background-process the display of the communication service information and form a voice or video call channel with the another terminal when the call connection request is accepted, and
wherein the another terminal is one of a portable multimedia player (PMP), a digital broadcasting player, personal digital assistant (PDA), a music player, a portable game terminal, a smart phone, a notebook computer, and a hand-held personal computer (PC), and the communication service list includes communication services supported by the another terminal.

17. A method of operating a receiver side terminal supporting a communication service, the method comprising:
receiving a call connection request message from another terminal;
transmitting a communication service list including communication services provided from the receiver side terminal, before accepting the call connection request message;
receiving, from the another terminal, selection information identifying a specific communication service selected from the communication service list; and
transmitting, to the another terminal, communication service information corresponding to the selection information accepted by the receiver side terminal during a call waiting time, and
terminating, pausing or background-processing the transmitting of the communication service information and forming a voice or video call channel with the another terminal when the call connection request is accepted,
wherein the receiver side terminal is one of a portable multimedia player (PMP), a digital broadcasting player, personal digital assistant (PDA), a music player, a portable game terminal, a smart phone, a notebook computer, and a hand-held personal computer (PC), and the communication service list includes communication services supported by the receiver side terminal.

18. A receiver side terminal for supporting a communication service, the receiver side terminal comprising:
a communication unit that receives a call connection request message from another terminal; and
a controller that controls the communication unit to transmit a communication service list including communication services supported by the receiver side terminal, before call connection, receive selection information identifying a specific communication service from the communication service list, transmit the communication service information corresponding to the selection information accepted by the receiver side terminal to the another terminal during a call waiting time, and terminate, pause or background-process the transmission of the communication service information and form a voice or video call channel with the another terminal when the call connection request is accepted,
wherein the receiver side terminal is one of a portable multimedia player (PMP), a digital broadcasting player, personal digital assistant (PDA), a music player, a portable game terminal, a smart phone, a notebook computer, and a hand-held personal computer (PC), and the communication service list includes communication services supported by the receiver side terminal.

* * * * *